United States Patent
Ogasawara et al.

(10) Patent No.: US 9,941,733 B2
(45) Date of Patent: Apr. 10, 2018

(54) ELECTRONIC DEVICE, COMMUNICATION SYSTEM, AND METHOD OF CONTROLLING ELECTRONIC DEVICE

(71) Applicant: SEIKO INSTRUMENTS INC., Chiba-shi, Chiba (JP)

(72) Inventors: Kenji Ogasawara, Chiba (JP); Akira Takakura, Chiba (JP); Tamotsu Maesawa, Chiba (JP); Kazuhiro Koyama, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 30 days.

(21) Appl. No.: 14/896,474

(22) PCT Filed: Sep. 3, 2014

(86) PCT No.: PCT/JP2014/073219
§ 371 (c)(1),
(2) Date: Dec. 7, 2015

(87) PCT Pub. No.: WO2015/041057
PCT Pub. Date: Mar. 26, 2015

(65) Prior Publication Data
US 2016/0190863 A1    Jun. 30, 2016

(30) Foreign Application Priority Data

Sep. 20, 2013  (JP) ................................ 2013-195772
Sep. 20, 2013  (JP) ................................ 2013-195773
Sep. 20, 2013  (JP) ................................ 2013-195774

(51) Int. Cl.
*H04B 10/114*    (2013.01)
*H02J 7/35*    (2006.01)
(Continued)

(52) U.S. Cl.
CPC ................ *H02J 7/35* (2013.01); *G04C 10/02* (2013.01); *G04G 19/00* (2013.01); *G04G 21/00* (2013.01);
(Continued)

(58) Field of Classification Search
CPC .......................... H04B 10/114; H04B 10/1141
See application file for complete search history.

(56) References Cited

U.S. PATENT DOCUMENTS

2009/0171571 A1*  7/2009  Son ........................ G01C 21/20
                                                    701/532
2010/0172647 A1*  7/2010  Luo ....................... H04J 3/0605
                                                      398/66
(Continued)

FOREIGN PATENT DOCUMENTS

JP       2001-99964 A  *  4/2001

OTHER PUBLICATIONS

Abstract, Publication No. 2001-099964, Publication Date Apr. 13, 2001.

*Primary Examiner* — Shi K Li
(74) *Attorney, Agent, or Firm* — Bruce L. Adams; Klintworth & Rozenblat IP LLP

(57) ABSTRACT

An electronic device includes a solar cell, a secondary battery that is charged by the solar cell, and a control circuit that switches between a charging period during which the charging of the secondary battery from the solar cell is performed and a communication period during which an optical signal is received by the solar cell. The optical signal includes a synchronization signal indicating the transmission of data and the data, and the communication period is configured to detect the synchronization signal. The control circuit extends the communication period to enable the solar cell to receive the whole data included in the optical signal.

24 Claims, 11 Drawing Sheets

10: MOBILE PHONE
101: TIME DATA OBTAINING UNIT
102: TRANSMISSION CONTROL UNIT
103: LIGHT SOURCE
20: ELECTRONIC TIMEPIECE
201: SOLAR CELL
202: CONTROL CIRCUIT
206: REFERENCE SIGNAL GENERATING CIRCUIT

(51) Int. Cl.
*G04G 19/00* (2006.01)
*H04L 29/08* (2006.01)
*H02S 10/20* (2014.01)
*G04C 10/02* (2006.01)
*G04G 21/04* (2013.01)
*H02S 40/38* (2014.01)
*G04G 21/00* (2010.01)
*H02J 7/00* (2006.01)
*H04L 7/00* (2006.01)
*H02J 1/06* (2006.01)

(52) U.S. Cl.
CPC .............. *G04G 21/04* (2013.01); *H02J 7/007* (2013.01); *H02J 7/0031* (2013.01); *H02J 7/0052* (2013.01); *H02J 7/0081* (2013.01); *H02S 10/20* (2014.12); *H02S 40/38* (2014.12); *H04B 10/114* (2013.01); *H04L 7/0075* (2013.01); *H04L 29/08* (2013.01); *H02J 1/06* (2013.01); *H02J 2007/0037* (2013.01); *H02J 2007/0095* (2013.01)

(56) References Cited

U.S. PATENT DOCUMENTS

| 2014/0266037 A1* | 9/2014 | Akiyoshi | H02J 7/025 320/108 |
| 2014/0268769 A1* | 9/2014 | Tran | F21V 29/006 362/249.02 |

\* cited by examiner

10: MOBILE PHONE
101: TIME DATA OBTAINING UNIT
102: TRANSMISSION CONTROL UNIT
103: LIGHT SOURCE
20: ELECTRONIC TIMEPIECE
201: SOLAR CELL
202: CONTROL CIRCUIT
206: REFERENCE SIGNAL GENERATING CIRCUIT

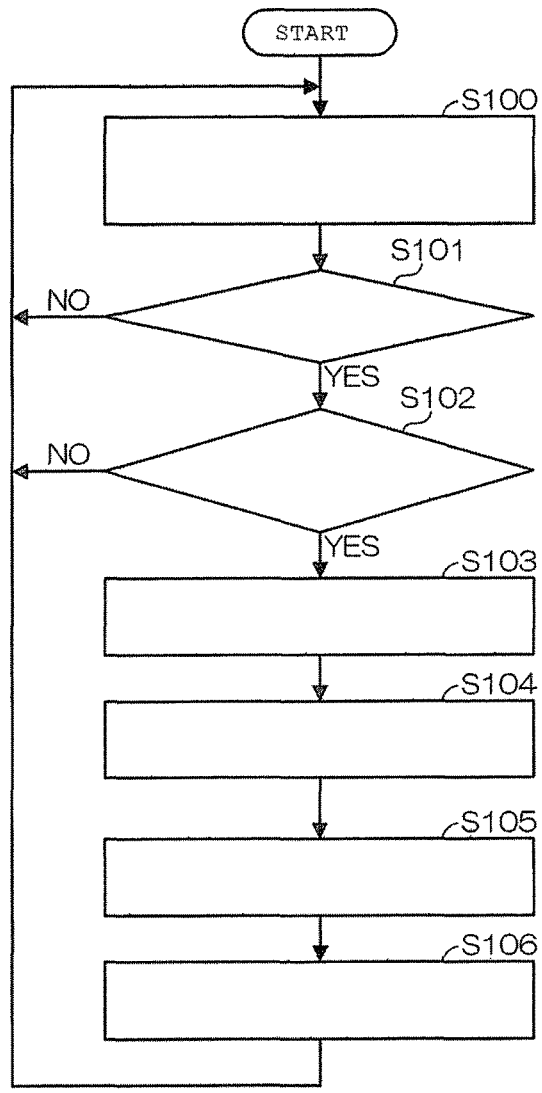

S100: PROVIDE COMMUNICATION PERIOD (OFF PERIOD) AND CHARGING PERIOD (ON PERIOD) BY SWITCHING SWITCH

S101: COMMUNICATION PERIOD (OFF PERIOD)?

S102: IS SYNCHRONIZATION SIGNAL RECEIVED FROM TERMINAL?

S103: MAINTAIN STATE OF SWITCH AND SWITCH TO COMMUNICATION PERIOD (OFF PERIOD)

S104: RECEIVE START SIGNAL FROM TERMINAL

S105: RECEIVE DATA FROM TERMINAL

S106: RETURN TO CHARGING PERIOD (ON PERIOD) BY SWITCHING SWITCH

FIG.2

10: MOBILE PHONE
101: TIME DATA OBTAINING UNIT
102: TRANSMISSION CONTROL UNIT
103: LIGHT SOURCE
20A: ELECTRONIC TIMEPIECE
201: SOLAR CELL
202A: CONTROL CIRCUIT
206: REFERENCE SIGNAL GENERATING CIRCUIT

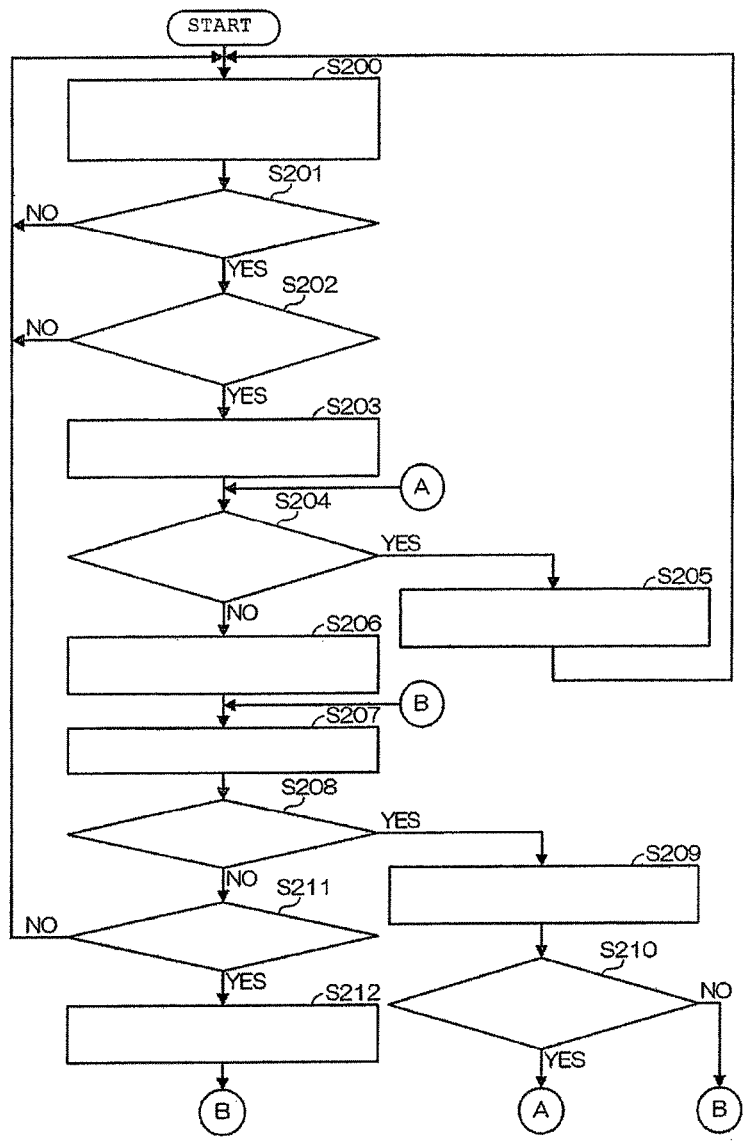

S200: PROVIDE COMMUNICATION PERIOD (OFF PERIOD) AND CHARGING PERIOD (ON PERIOD) BY SWITCHING SWITCH
S201: COMMUNICATION PERIOD (OFF PERIOD)?
S202: IS SYNCHRONIZATION SIGNAL RECEIVED FROM TERMINAL?
S203: MAINTAIN STATE OF SWITCH AND SWITCH TO COMMUNICATION PERIOD (OFF PERIOD)
S204: IS DATA RECEIVED WITHIN PREDETERMINED TIME?
S206: SWITCH TO CHARGING PERIOD (ON PERIOD) BY SWITCHING SWITCH
S207: DETECT VOLTAGE VALUE OF SECONDARY BATTERY
S208: FULLY-CHARGED STATE?
S211: OVER-DISCHARGED STATE?
S212: SWITCH TO CHARGING PERIOD (ON PERIOD) BY SWITCHING SWITCH
S205: RETURN TO CHARGING PERIOD (ON PERIOD) BY SWITCHING SWITCH
S209: SWITCH TO COMMUNICATION PERIOD (OFF PERIOD) BY SWITCHING SWITCH
S210: IS SYNCHRONIZATION SIGNAL RECEIVED FROM TERMINAL?

FIG.5

10: MOBILE PHONE
101: TIME DATA OBTAINING UNIT
102B: TRANSMISSION CONTROL UNIT
103: LIGHT SOURCE
20B: ELECTRONIC TIMEPIECE
201: SOLAR CELL
202B: CONTROL CIRCUIT
206: REFERENCE SIGNAL GENERATING CIRCUIT

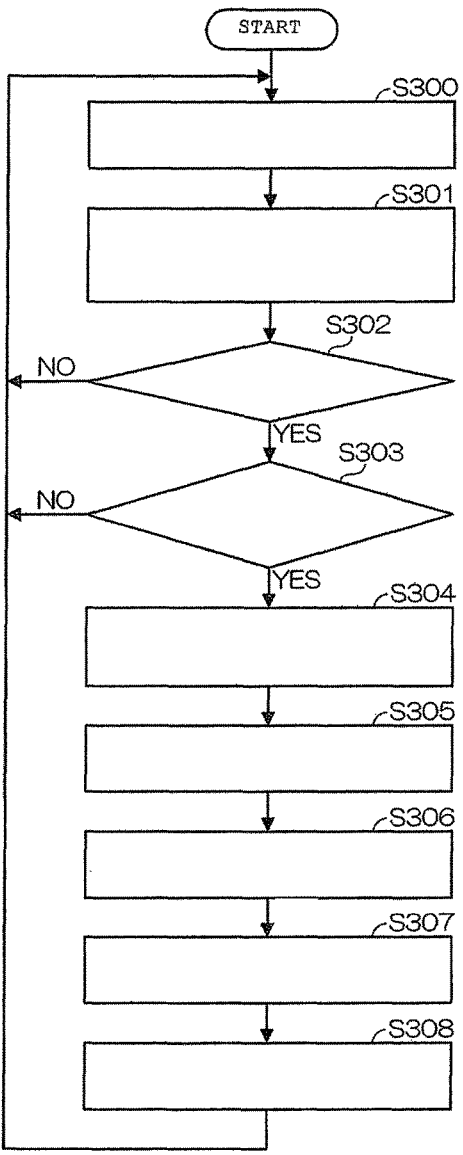

S300: SET COMMUNICATION RATE TO BE LOW COMMUNICATION RATE
S301: PROVIDE COMMUNICATION PERIOD (OFF PERIOD) AND CHARGING PERIOD (ON PERIOD) BY SWITCHING SWITCH
S302: COMMUNICATION PERIOD (OFF PERIOD)?
S303: IS SYNCHRONIZATION SIGNAL RECEIVED FROM TERMINAL?
S304: MAINTAIN STATE OF SWITCH AND SWITCH TO COMMUNICATION PERIOD (OFF PERIOD)
S305: SET COMMUNICATION RATE TO BE HIGH COMMUNICATION RATE
S306: RECEIVE START SIGNAL FROM TERMINAL
S307: RECEIVE DATA FROM TERMINAL
S308: RETURN TO CHARGING PERIOD (ON PERIOD) BY SWITCHING SWITCH

FIG.8

ELECTRONIC DEVICE, COMMUNICATION SYSTEM, AND METHOD OF CONTROLLING ELECTRONIC DEVICE

TECHNICAL FIELD

The present invention relates to an electronic device, a communication system, and a method of controlling an electronic device.

The present invention claims the benefit of Japanese Patent Application Nos. 2013-195772, 2013-195773, and 2013-195774 filed in the Japanese Patent Office on Sep. 20, 2013, respectively, the entire disclosures of which are incorporated herein by reference.

BACKGROUND ART

In the related art, in an electronic timepiece provided with a solar cell, a normal operation mode in which a secondary battery is charged by the solar cell is executed. There has been suggested a technology in which in the electronic timepiece provided with the solar cell, when a mode is switched to a predetermined operation state through the manipulation of a user, a data transmission mode is executed, an optical signal from an external device is received using the solar cell, and the received data is written in an internal data storage circuit (for example, see PTL 1).

CITATION LIST

Patent Literature

[PTL 1] JP-A-2001-99964

SUMMARY OF INVENTION

Technical Problem

As mentioned above, in the related art, when data communication with the external device is performed using the solar cell, since it is necessary to set the state to be the data transmission mode through predetermined manipulation, there is a problem that manipulation for performing the communication is complicated.

The present invention has been made in view of such circumstances, and it is an object of the invention to provide an electronic device, a communication system, and a method of controlling an electronic device which are capable of reducing the number of times manipulation associated with communication using a solar cell.

Solution to Problem

According to an aspect of the present invention, there is provided an electronic device including: a solar cell; a secondary battery that is charged by the solar cell; and a control circuit that switches between a charging period during which the charging of the secondary battery from the solar cell is performed and a communication period during which an optical signal is received by the solar cell.

The electronic device according to the aspect of the present invention may further include a switch that switches a connected state of the solar cell and the secondary battery. The control circuit may control the switch such that the secondary battery is disconnected from the solar cell during the communication period, and may control the switch such that the secondary battery is connected to the solar cell during the charging period.

In the electronic device according to the aspect of the present invention, the control circuit may detect a voltage value of the secondary battery, may determine whether or not the detected voltage value is greater than a first threshold, and may control the switch such that the secondary battery is disconnected from the solar cell when it is determined that the detected voltage value is greater than the first threshold.

In the electronic device according to the aspect of the present invention, the control circuit may detect the voltage value of the secondary battery, may determine whether or not the detected voltage value is less than a second threshold, and may control the switch such that the secondary battery is connected to the solar cell when it is determined that the detected voltage value is less than the second threshold.

In the electronic device according to the aspect of the present invention, the optical signal may include a synchronization signal indicating the transmission of data, and the data, and a period of the synchronization signal may be longer than the charging period.

In the electronic device according to the aspect of the present invention, the control circuit may switch between the communication period and the charging period after the data is received during the communication period.

In the electronic device according to the aspect of the present invention, when the data is not received during the communication period, the control circuit may switch from the communication period to the charging period after a predetermined amount of time elapses.

The electronic device according to the aspect of the present invention may further include: a switch that switches a connected state of the solar cell and the secondary battery. The control circuit may control the switch such that the secondary battery is disconnected from the solar cell during the communication period, and may control the switch such that the secondary battery is connected to the solar cell during the charging period.

In the electronic device according to the aspect of the present invention, the control circuit may detect a voltage value of the secondary battery, may determine whether or not the detected voltage value is greater than a first threshold, and may control the switch such that the secondary battery is disconnected from the solar cell when it is determined that the detected voltage value is greater than the first threshold.

In the electronic device according to the aspect of the present invention, the control circuit may detect the voltage value of the secondary battery, may determine whether or not the detected voltage value is less than a second threshold, and may control the switch such that the secondary battery is connected to the solar cell when it is determined that the detected voltage value is less than the second threshold.

The electronic device according to the aspect of the present invention may further include: a generation circuit that generates a reference signal for generating time information. When time information regarding time is included in the data, the control circuit may reset the reference signal based on the received time information.

In the electronic device according to the aspect of the present invention, a period of the optical signal may be a cycle of the reference signal.

In the electronic device according to the aspect of the present invention, the control circuit may switch between the communication period and the charging period at a predetermined time based on the received time information after the reference signal is reset.

In the electronic device according to the aspect of the present invention, the control circuit may measure a voltage value of the solar cell at predetermined time intervals, and may switch from the charging period to the communication period when a pattern constructed by a plurality of states of the measured voltage values is coincident with a predetermined pattern.

In the electronic device according to the aspect of the present invention, during the communication period, the control circuit may receive a synchronization signal which is included in the optical signal and indicates the transmission of the optical signal at a first communication rate, and then may receive data included in the optical signal by switching to a second communication rate greater than the first communication rate.

In the electronic device according to the aspect of the present invention, the control circuit may control such that the optical signal is received at the first communication rate when the period is switched from the charging period to the communication period.

In the electronic device according to the aspect of the present invention, the control circuit may switch from the second communication rate to the first communication rate after the data is received.

In the electronic device according to the aspect of the present invention, the control circuit may switch from the second communication rate to the first communication rate when the period is switched from the communication period to the charging period.

In the electronic device according to the aspect of the present invention, the synchronization signal, a start signal indicating the transmission start of the data and the data of the optical signal may be transmitted in sequence, and the control circuit may switch from the first communication rate to the second communication rate when it is determined that the synchronization signal is received.

In the electronic device according to the aspect of the present invention, when information that is included in the synchronization signal and indicates the end of the synchronization signal is received, the control circuit may switch from the first communication rate to the second communication rate, and may receive the start signal and the data.

In the electronic device according to the aspect of the present invention, when the start signal is received, the control circuit may switch from the first communication rate to the second communication rate.

In the electronic device according to the aspect of the present invention, the synchronization signal may be a signal of which a first half is a first signal pattern and a second half is a second signal pattern, and the control circuit may control such that the first communication rate is maintained when the synchronization signal having the first signal pattern is received, and may control such that the communication rate is switched from the first communication rate to the second communication rate when the synchronization signal having the second signal pattern is received.

In the electronic device according to the aspect of the present invention, at least one timing of timings when the first communication rate and the second communication rate are started and ended may be a timing synchronized with a reference signal for generating time information.

According to an aspect of the present invention, there is provided a communication system that includes a first electronic device, and a second electronic device which communicates with the first electronic device. The second electronic device includes: a light source; and a transmission control unit which transmits an optical signal including a synchronization signal indicating the transmission of data and the data to the first electronic device by controlling a light emitting state of the light source. The first electronic device includes: a solar cell; a secondary battery which is charged by the solar cell; and a control circuit which switches between a charging period during which the charging of the secondary battery from the solar cell is performed and a communication period during which an optical signal is received by the solar cell. The charging period is shorter than a period of the synchronization signal.

According to an aspect of the present invention, there is provided an electronic device including: a light source; and a transmission control unit that transmits an optical signal including a synchronization signal indicating the transmission of data and the data to another electronic device by controlling a light emitting state of the light source. The data is used to generate time information in the other electronic device.

In the electronic device according to the aspect of the present invention, the electronic device may be a terminal that includes the light source and the transmission control unit.

In the electronic device according to the aspect of the present invention, the electronic device may be an illumination device that includes the light source and the transmission control unit.

According to an aspect of the present invention, there is provided a method of controlling an electronic device including: a control procedure of causing a control circuit to switch between a charging period during which the charging of a secondary battery from a solar cell is performed and a communication period during which an optical signal is received by the solar cell.

Advantageous Effects of Invention

According to the present invention, it is possible to reduce the number of times manipulation associated with communication using a solar cell.

BRIEF DESCRIPTION OF DRAWINGS

FIG. 2 is a flowchart for describing the operation of the electronic timepiece according to the first, fourth and seventh embodiments.

FIG. 5 is a flowchart for describing the operation of the electronic timepiece according to the second, fifth and eighth embodiments.

FIG. 8 is a flowchart for describing the operation of the electronic timepiece according to the third, sixth and ninth embodiments.

DESCRIPTION OF EMBODIMENTS

Hereinafter, embodiments of the present invention will be described with reference to the drawings. In the following description, an example in which one of two types of electronic devices is a mobile phone and the other one is an electronic timepiece will be mainly described.

First Embodiment

Firstly, a first embodiment of the present invention will be described.

Figure 1:
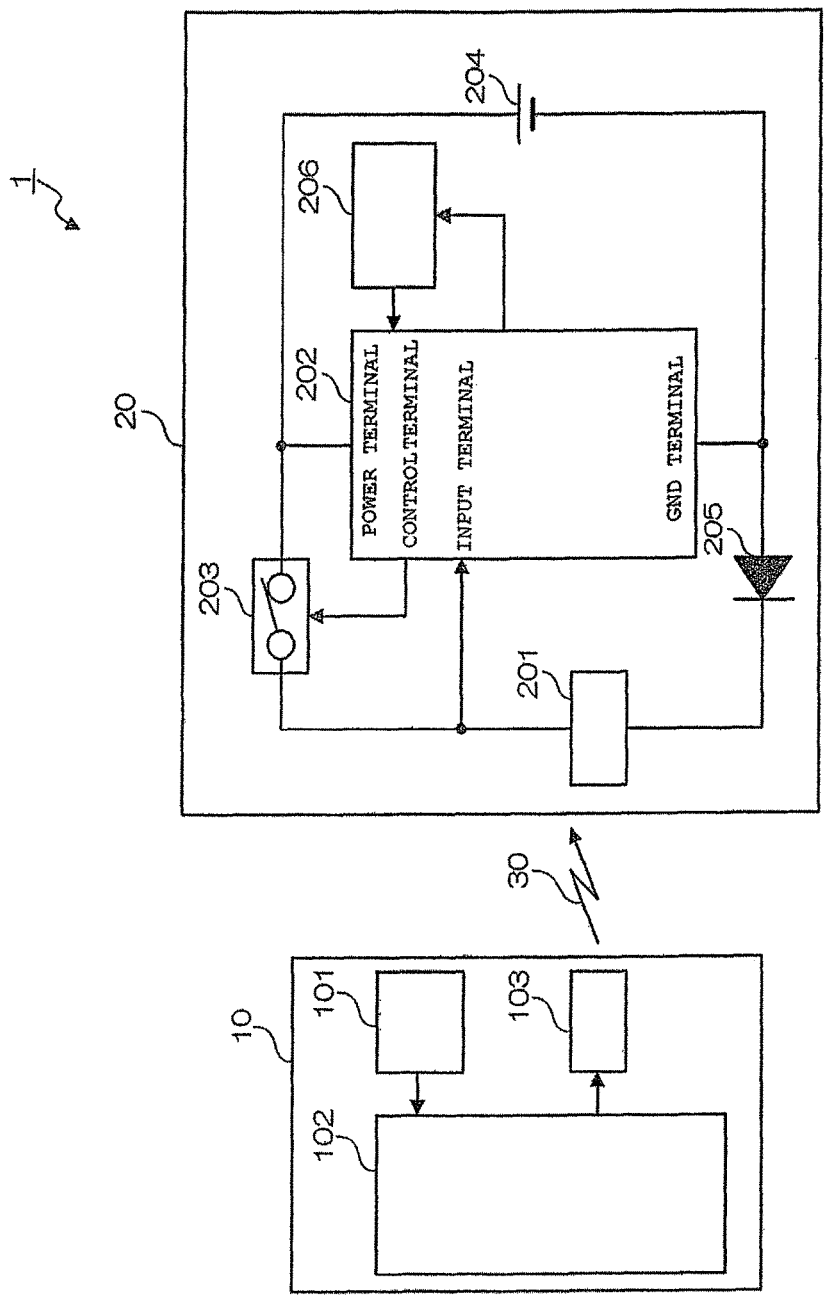
FIG. 1 is a block diagram showing the configurations of a mobile phone and an electronic timepiece of an optical communication system using the electronic timepiece according to first, fourth and seventh embodiments.

FIG. 1 is a block diagram showing the configurations of a mobile phone 10 and an electronic timepiece 20 of an optical communication system 1 using the electronic timepiece 20 according to the first embodiment. Only the configurations according to the present invention will be illustrated, and other configurations will be omitted.

In FIG. 1, the optical communication system 1 includes the mobile phone 10 and the electronic timepiece 20. The mobile phone 10 includes a time data obtaining unit 101, a transmission control unit 102, and a light source 103.

In the present embodiment, an example in which the mobile phone is used as a device that transmits data will be described. However, as the device that transmits data, a device that includes a light source and is capable of controlling a light emitting state of the light source may be used.

The time data obtaining unit 101 obtains the current time. More particularly, the time data obtaining unit 101 obtains the current time by using any method of a method of obtaining the current time by accessing a time server on the Internet, a method of obtaining the current time using the Global Positioning System (GPS), and a method of obtaining the current time from a control signal from a base station.

For example, the transmission control unit 102 converts time data obtained by the time data obtaining unit 101 into an optical signal to emit the converted optical signal from the light source 103 in response to the manipulation of a user. As will be described below, examples of the optical signal include a synchronization signal, a start signal, and time data. The transmission control unit 102 emits the optical signal by controlling the turn-on and turn-off of the light source 103.

The light source 103 includes a light-emitting diode (LEDs) for a flash included in the mobile phone 10, and a backlight of a liquid crystal panel. Light emitted from the light source 103 is light having a wavelength which is received as a signal by a solar cell 201 included in the electronic timepiece 20 and generates a power, and is, for example, white light.

The electronic timepiece 20 includes the solar cell 201, a control circuit 202, a switch 203, a secondary battery 204, a diode 205, and a reference signal generating circuit 206 (a generation circuit).

The solar cell 201 functions as a power generator that receives light from an external light source (sun or illumination) and converts the received light into electric energy during a charging period, and functions as a light receiver for performing optical communication with the mobile phone 10 during a communication period. One end and the other end of the solar cell 201 are respectively connected to an input terminal of the control circuit 202 and one end of the diode 205. The charging period and the communication period will be described below.

The control circuit 202 controls the charging of the secondary battery 204 using the solar cell 201, prevents overcharging of the secondary battery 204, or controls the optical communication using the solar cell 201. More specifically, the control circuit 202 is operated by an electric power from the secondary battery 204 connected to a power terminal and a ground (GND) terminal, and determines a charged state (a fully charged state or an over-discharged state) of the secondary battery 204 by detecting an output voltage of the secondary battery, and performs predetermined charging control. That is, the control circuit 202 controls the turn-on state (connection) and the turn-off state (disconnection) of the switch 203 by a control signal output from a control terminal depending on the charged state of the secondary battery 204. The control circuit 202 charges the secondary battery 204 by connecting the solar cell 201 with the secondary battery 204, and prevents the overcharging of the secondary battery 204 by disconnecting the solar cell from the secondary battery.

The control circuit 202 switches between the connection (a charging period: an ON period, a period of time during which communication is not performed) of the solar cell 201 with the secondary battery 204 and the disconnection (a communication period: an OFF period, a period of time during which charging is not performed) of the solar cell 201 from the secondary battery 204 by controlling the turn-on state or the turn-off state of the switch 203 by a switch control signal, based on a reference signal and a signal oscillated from the reference signal generating circuit 206.

The control circuit 202 receives time data transmitted from an external device (in this case, the mobile phone 10) through the optical communication by detecting an output voltage of the solar cell 201 input to the input terminal and converting the detected voltage into an electrical signal during the communication period. Although it has been described in the present embodiment that the time data is transmitted as the data from the mobile phone 10, the present invention is not limited thereto, but another type of data may be used. The control circuit 202 detects a synchronization signal, to be described below, by using a frequency-divided signal input from the reference signal generating circuit 206.

The switch 203 switches between the connection (the charging period) of the solar cell 201 with the secondary battery 204 and the disconnection (the communication period) of the solar cell 201 from the secondary battery 204 in response to the switch control signal from the control circuit 202.

The diode 205 prevents the backflow of a charging current toward the solar cell 201.

The reference signal generating circuit 206 includes an oscillation circuit (for example, 32 kHz) and a frequency-dividing circuit, and generates a reference signal of, for example, 1 Hz. The reference signal generating circuit 206 divides an oscillated signal of 32 kHz, and generates a frequency-divided signal of a frequency corresponding to a communication rate, to be described below. The reference signal generating circuit 206 outputs the frequency-divided signal and the generated reference signal to the control circuit 202.

Next, the operation of the first embodiment will be described.

Figure 3:
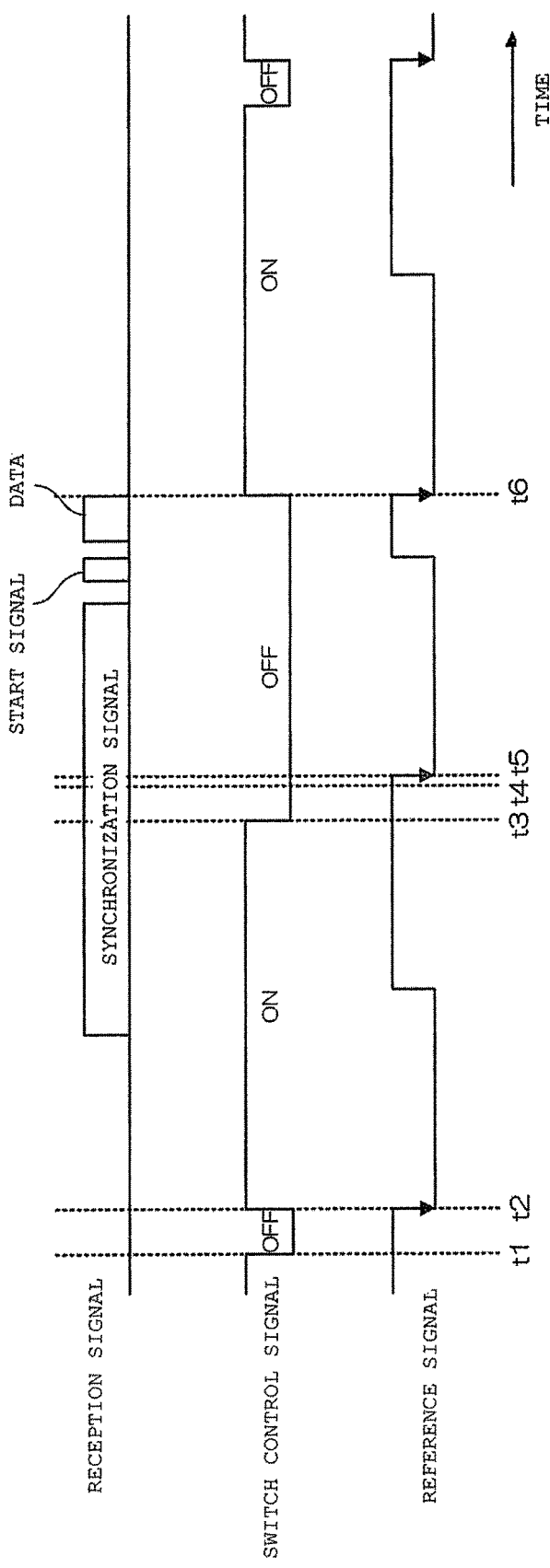
FIG. 3 is a timing chart for describing an operational example of the electronic timepiece according to the first, fourth and seventh embodiments.

FIG. 2 is a flowchart for describing the operation of the electronic timepiece 20 according to the first embodiment. FIG. 3 is a timing chart for describing an operational example of the electronic timepiece 20 according to the first embodiment. In FIG. 3, the topmost part shows a transmission signal output from the mobile phone 10 through the optical communication, that is, a reception signal of the electronic timepiece 20, the middle part shows a switch control signal for switching between the turn-on state and the turn-off state of the switch 203 by the control circuit 202 of the electronic timepiece 20, and the bottommost part shows a reference signal generated by the reference signal generating circuit 206 of the electronic timepiece 20.

The transmission control unit 102 of the mobile phone 10 converts the transmission signal including the time data obtained by the time data obtaining unit 101 into the optical signal to emit the converted optical signal from the light source 103, as shown in the topmost part of FIG. 3. More particularly, the transmission signal includes a synchronization signal, a start signal, and data. The start signal is a signal indicating the start of data. The data is, for example, time data. In FIG. 3, one cycle of the reference signal is a period of time from t2 to t5, and is, for example, one second.

Hereinafter, the synchronization signal will be described. The synchronization signal is a pattern in which a predetermined H (turn-on) state and a predetermined L (turn-off) state are continuously repeated multiple times, and is, for example, HLHL . . . , or HLLHLL . . . . For example, the detection of the synchronization signal is performed by detecting a pattern of HLHL. When the synchronization signal is detected, if a person shades the solar cell 201 with their hand or passes in front of the solar cell 201, a pattern of HLH may be artificially generated. For this reason, a period of time from t1 to t2 shown in FIG. 3, that is, the communication period (the OFF period) is set to be greater than the time capable of detecting the pattern of the synchronization signal HLHL. The pattern of the synchronization signal is not limited to the pattern of HLHL as long as the pattern of the synchronization signal is longer than the artificially generated pattern of HLH.

(Step S100) In the electronic timepiece 20, the control circuit 202 initially controls the communication period (the OFF period) and the charging period (the ON period) by switching the switch 203 by using the switch control signal. As shown in the middle part of FIG. 3, the control circuit 202 outputs the switch control signal having a period of time from t1 to t3 as one cycle (for example, about 1 second). For example, the OFF period of a period of time from t1 to t2 is 1/100 of one cycle, and the ON period of a period of time from t2 to t3 is 99/100 of one cycle. After step S100 is ended, the control circuit 202 proceeds to a process of step S101.

(Step S101) The control circuit 202 determines whether or not the current time is the communication period (the OFF period). When the current time is not the communication period (the OFF period), that is, when it is determined that the current time is the charging period (the ON period) (step S101; NO), the control circuit 202 returns to step S100. In this case, the charging operation of the secondary battery 204 from the solar cell 201 is continued. When it is determined that the current time is the communication period (the OFF period), that is, when it is determined that the current time is the charging period (the ON period) (step S101; YES), the control circuit 202 proceeds to step S102.

(Step S102) The control circuit 202 determines whether or not the synchronization signal is received from the mobile phone 10 during the OFF periods of a period of time from t1 to t2 and a period of time from t3 to t5. When it is determined that the synchronization signal is not received (step S102; NO), the control circuit 202 returns to step S100. That is, when the synchronization signal is not received during the communication period (the OFF period), the control circuit 202 automatically switches to the charging period (the ON period) at the time t2 or the time t5. When it is determined that the synchronization signal is received during the communication period (the OFF period) (step S102; YES), the control circuit 202 proceeds to step S103.

(Step S103) The control circuit 202 maintains the state (OFF) of the switch 203, and switches to the communication period (the OFF period). In the example shown in FIG. 3, the control circuit 202 determines that the synchronization signal is received at the time t4, and maintains the state (OFF) of the switch 203 until the reception of the data is ended after the time t4. After step S103 is ended, the control circuit 202 proceeds to a process of step S104.

(Step S104) The control circuit 202 receives the start signal transmitted from the mobile phone 10 during the communication period (the OFF period). After step S104 is ended, the control circuit 202 proceeds to a process of step S105.

(Step S105) The control circuit 202 receives the data transmitted from the mobile phone 10. After step S105 is ended, the control circuit 202 proceeds to a process of step S106.

(Step S106) After the data is received, the control circuit 202 returns to the charging period (the ON period) by switching the switch 203. This step corresponds to an operation at a time t6 shown in FIG. 3. Thereafter, the control circuit 202 returns to the process of step S100, and repeatedly performs the above-described operations.

When the received data is the time data, the control circuit 202 may reset the reference signal (for example, 1 Hz) generated by the reference signal generating circuit 206. As represented by the time t6 shown in FIG. 3, the reset means that a signal value of the reference signal is set to be a low level and the next cycle is started at this point in time. The reset corresponds to the reference signal at the time t6 shown in FIG. 3. The reference signal has the time from t2 to t5 as one cycle and is a signal of which the next cycle starts at the time t5. At the time from t2 to t5, a period of a low level and a period of a high level are the same period of time. Meanwhile, at the time from t5 to t6, since the signal is reset in the middle of the period of the high level, the period of the high level is shorter than the period of the low level.

As mentioned previously, the switch 203 serves as a switch for preventing the overcharging of the secondary battery 204. For this reason, the control circuit 202 detects a voltage value of the secondary battery 204, and determines whether or not the detected voltage value is a voltage value in the fully-charged state. When it is determined that the detected voltage value is the voltage value in the fully-charged state, the control circuit 202 switches to the turn-off state of the switch 203, and does not perform the charging of the secondary battery 204. In this case, the switch control signal maintains the turn-off state.

The control circuit 202 may constantly detect the synchronization signal for a period of time during which the turn-off state is maintained. Alternatively, since the power consumption of the control circuit 202 is increased when the synchronization signal is constantly detected, even though the turn-off state is maintained due to such a reason, the control circuit 202 may detect the synchronization signal for only a period corresponding to the OFF period when the ON period and the OFF period are periodically repeated, as shown in FIG. 3.

As stated above, the electronic device (the electronic timepiece 20) of the present embodiment includes the solar cell 201, the secondary battery 204 that is charged by the solar cell, and the control circuit 202 that switches between the charging period during which the charging of the secondary battery from the solar cell is performed and the communication period during which the optical signal is received by the solar cell at every predetermined time interval.

In such a configuration, according to the first embodiment, since the charging period and the communication period repeated at predetermined cycles are provided and the optical communication is performed by the solar cell 201 during the communication period, the electronic timepiece 20 performs the optical communication without switching to a communication mode through the manipulation of the user on the electronic timepiece 20.

As a result, in the electronic timepiece 20 of the present embodiment, it is possible to reduce the number of times the manipulation is performed on the electronic timepiece 20 when the communication is performed.

In the electronic timepiece 20 of the present embodiment, the control circuit 202 controls the switch 203, and thus, the connection of the solar cell 201 with the secondary battery 204 or the disconnection of the solar cell from the secondary batter is performed.

For the period of time during which the optical signal is received, when the solar cell 201 and the secondary battery 204 are connected, the optical signal detected by the control circuit 202 is affected by the voltage value of the secondary battery 204 in some cases. For example, when the level of the optical signal is lower than the voltage of the secondary battery 204, the optical signal as an output of the solar cell 201 may be drawn by the voltage of the secondary battery 204, and thus, the control circuit 202 has difficulty distinguishing between the optical signal and external disturbance light. As mentioned above, when the solar cell 201 and the secondary battery 204 are connected for the period of time during which the optical signal is received, reception accuracy is degraded in some cases. Accordingly, according to the first embodiment, it is possible to improve the reception accuracy by disconnecting the solar cell 201 from the secondary battery 204 for a period of time during which the optical communication is performed.

Second Embodiment

Next, a second embodiment of the present invention will be described.

Figure 4:
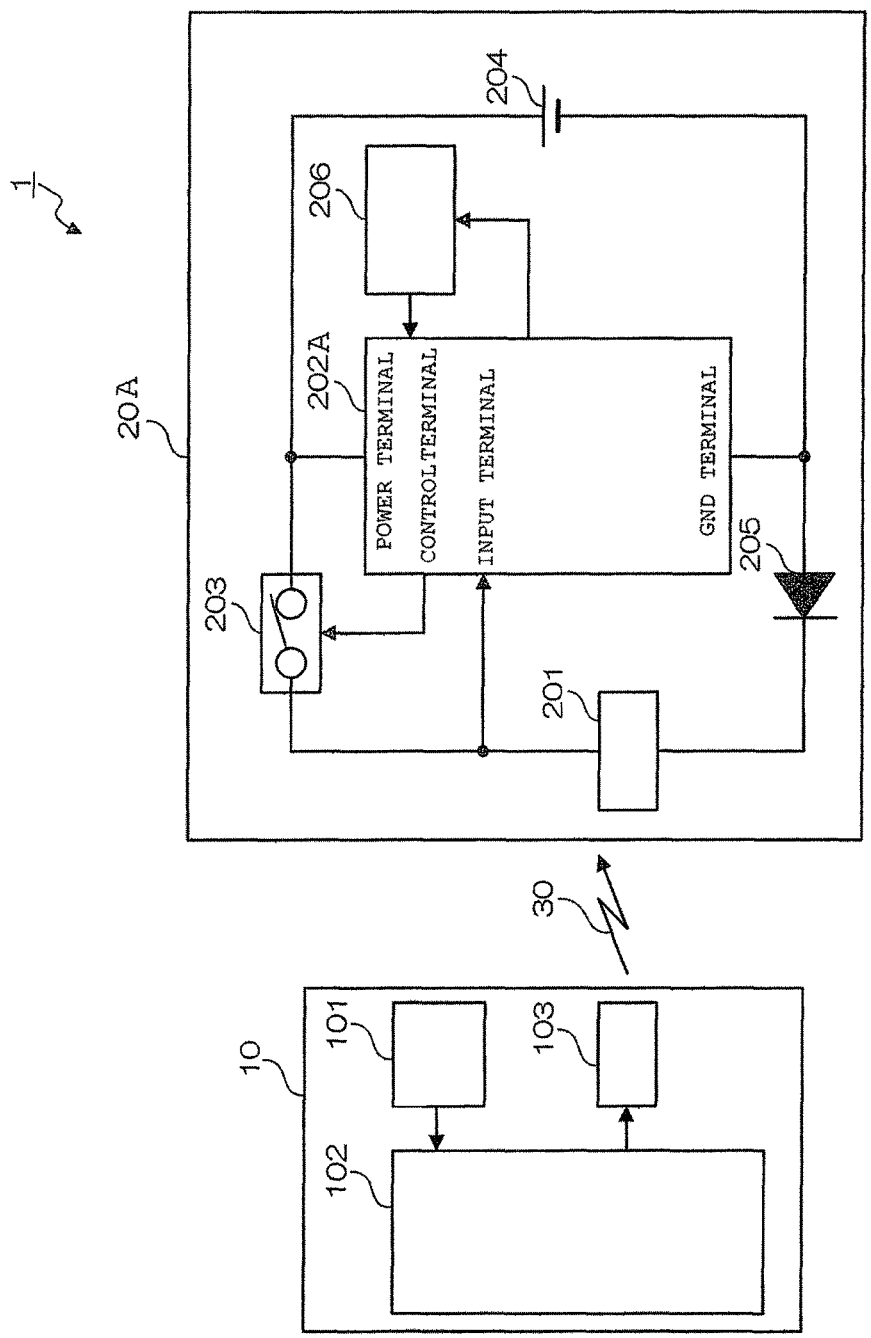
FIG. 4 is a block diagram showing the configurations of a mobile phone and an electronic timepiece of an optical communication system using the electronic timepiece according to second, fifth and eighth embodiments.

FIG. 4 is a block diagram showing the configurations of a mobile phone 10 and an electronic timepiece 20A of an optical communication system 1A using the electronic timepiece 20A according to the second embodiment. The parts corresponding to FIG. 1 will be assigned the same reference numerals, and thus, the description thereof will be omitted.

As shown in FIG. 4, the mobile phone 10 includes a time data obtaining unit 101, a transmission control unit 102, and a light source 103. The electronic timepiece 20A includes a solar cell 201, a control circuit 202A, a switch 203, a secondary battery 204, a diode 205, and a reference signal generating circuit 206 (a generation circuit).

In FIG. 4, the control circuit 202A of the electronic timepiece 20A may switch between a charging period (an ON period) and a communication period (an OFF period) at predetermined cycles, may receive a synchronization signal during the communication period (the OFF period), and may control the switch 203 depending on a charged state (a fully-charged state or an over-discharged state) of the secondary battery when data is not received within a predetermined time, and may set the charging period (the ON period) and the communication period (the OFF period).

By controlling the switch 203 between the turn-on state and the turn-off state by a control signal output from a control terminal depending on the charging state of the secondary battery 204, the control circuit 202A performs the charging of the secondary battery 204 by connecting the solar cell 201 with the secondary battery 204, and prevents the overcharging of the secondary battery 204 by disconnecting the solar cell from the secondary battery. The control circuit 202A detects a voltage value of the secondary battery 204, and determines whether or not the detected voltage value is greater than a first threshold. When it is determined that the detected voltage value is greater than the first threshold, the control circuit 202A prevents the overcharging by controlling the switch 203 to enter the turn-off state such that the secondary battery 204 is disconnected from the solar cell 201.

The control circuit 202A prevents the over-discharging of the secondary battery 204 by controlling the switch 203 between the turn-on state and the turn-off state by the control signal output from the control terminal depending on the charged state of the secondary battery 204. The control circuit 202A detects the voltage value of the secondary battery 204, and determines whether or not the detected voltage value is smaller than a second threshold. When it is determined that the detected voltage value is smaller than the second threshold, the control circuit 202A prevents the over-discharging by controlling the switch 203 to enter the turn-on state such that the secondary battery 204 is connected to the solar cell 201.

In the second embodiment, the mobile phone 10 transmits the synchronization signal for a period longer than the charging period (the ON period) in the electronic timepiece 20A. When the rising of the charging period (the ON period) and the start of the synchronization signal occur simultaneously, the synchronization signal is not detected by the electronic timepiece 20A in some cases when the rising of the synchronization signal and the charging period (the ON period) are the same. When a cycle of the charging period (the ON period) and the communication period (the OFF period) is one second, it is preferable that the synchronization signal is, for example, one second or more. The duration of the synchronization signal may be changed by the user. For example, when the synchronization signal is not detected at an initial value, the duration of the synchronization signal may be set by the user so as to be lengthened.

Next, the operation of the second embodiment will be described.

Figure 6:
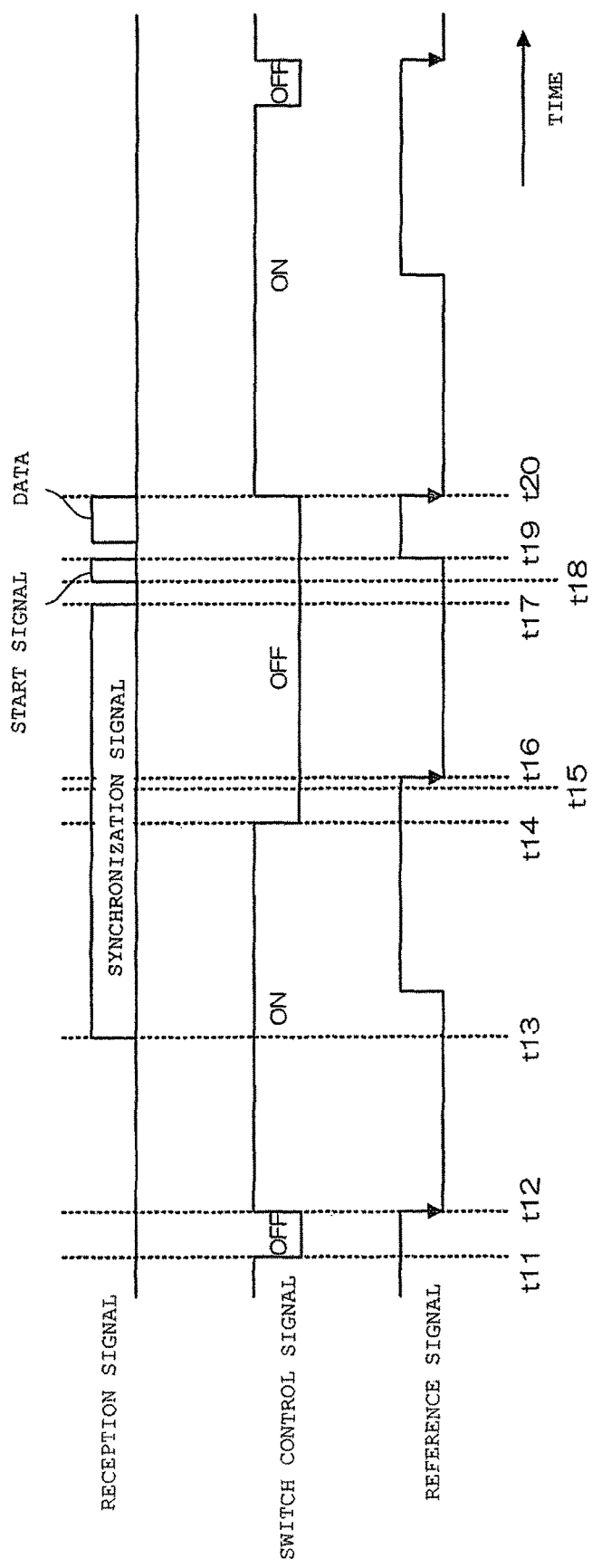
FIG. 6 is a timing chart for describing an operational example of the electronic timepiece according to the second, fifth and eighth embodiments.

FIG. 5 is a flowchart for describing the operation of the electronic timepiece 20A according to the second embodiment. FIG. 6 is a timing chart for describing an operational example of the electronic timepiece 20A according to the second embodiment. In FIG. 6, the topmost part shows a transmission signal output from the mobile phone 10 through the optical communication, that is, a reception signal of the electronic timepiece 20A, the middle part shows a switch control signal for switching between the turn-on state and the turn-off state of the switch 203 by the control circuit 202A of the electronic timepiece 20A, and the bottommost part shows a reference signal generated by the reference signal generating circuit 206 of the electronic timepiece 20A.

The transmission control unit 102 of the mobile phone 10 converts the transmission signal including the time data obtained by the time data obtaining unit 101 into the optical signal to emit the converted optical signal from the light source 103, at a time t13 as shown in the topmost part of FIG. 6. More particularly, the transmission signal includes a synchronization signal, a start signal, and data. For example, the synchronization signal is a signal having a pattern in which a predetermined high level and a predetermined low level are repeated.

As stated above, it is preferable that the duration of the synchronization signal is longer than the charging period (the ON period, a period of time from t12 to t14). FIG. 6 shows an example in which, for example, H of the synchronization signal is detected at the time t14 and the detection of the synchronization signal is ended at a timing of a time t15.

The start signal is a signal indicating the start of data. The data is time data. The data includes a second reset bit, and an end bit. Here, the second reset bit refers to a bit indicating a timing when the reference signal is reset, and the end bit refers to a bit indicating the end of the data.

(Steps S200 to S202) The control circuit 202A of the electronic timepiece 20A performs processes of steps S201 and S202, similarly to steps S100 to S102 (FIG. 2). After step S202 is ended, the control circuit 202A proceeds to a process of step S203.

(Step S203) The control circuit 202A maintains the state (OFF) of the switch 203, and switches to the communication period (the OFF period). This step corresponds to an operation after the time t15 shown in FIG. 6. After step S203 is ended, the control circuit 202A proceeds to a process of step S204.

(Step S204) The control circuit 202A determines whether or not data is received within a predetermined time. The control circuit 202A proceeds to step S205 when the data is received within the predetermined time (step S204; YES), and proceeds to step S206 when the data is not received within the predetermined time (step S204; NO).

(Step S205) After the data is received from the mobile phone 10, the control circuit 202A returns to the charging time (the ON period) by switching the switch 203, and returns to step S200, similarly to step S106 (FIG. 2). This step corresponds to an operation at a time t20 shown in FIG. 6.

The control circuit may return to the charging time (the ON period) when the end bit of the data is received, or after the data is received. When the second reset bit included in the data is detected, the control circuit 202A resets the reference signal of the reference signal generating circuit 206 (the time t20). For this reason, the timing when the switch control signal represented by the time t20 of FIG. 6 is switched from the OFF state to the ON state and the timing when the reference signal is reset may not be necessarily equal to each other.

(Step S206) The control circuit 202A switches to the charging period (the ON period) by switching the switch 203. That is, when the synchronization signal is received but the data is not received, the control circuit 202A determines that some communication errors occur, for example, a direction of the light source of the mobile phone 10 is changed, and stops a communication operation (a reception operation) in which power consumption is high. After step S207 is ended, the control circuit 202A proceeds to a process of step S208.

(Step S207) The control circuit 202A detects the voltage value of the secondary battery 204. After step S207 is ended, the control circuit 202A proceeds to a process of step S208.

(Step S208) The control circuit 202A determines whether or not the detected voltage value is greater than the first threshold. The control circuit 202A determines that the secondary battery is in the fully-charged state when the detected voltage value is greater than the first threshold, and determines that the secondary battery is not in the fully-charged state when the detected voltage value is equal to or less than the first threshold. The control circuit 202A proceeds to step S209 when it is determined that the secondary battery is in the fully-charged state (step S208; YES), and proceeds to step S211 when the secondary battery is not in the fully-charged state (step S208; NO).

(Step S209) The control circuit 202A switches to the communication period (the OFF period) by switching the switch 203, and does not perform the charging of the secondary battery 204. After step S209 is ended, the control circuit 202A proceeds to a process of step S210.

(Step S210) The control circuit 202A determines whether or not the synchronization signal is received from the mobile phone 10 (the terminal). When it is determined that the synchronization signal is not received (step S210; NO), the control circuit 202A returns to step S207, and detects that the synchronization signal is received from the mobile phone 10 in a state where the communication period (the OFF period) is maintained for a period of time during which the secondary battery 204 is fully charged.

In this case, since the power consumption of the control circuit 202A is increased when the synchronization signal is constantly detected, even though the communication period (the OFF period) is maintained, the control circuit 202A may detect the synchronization signal for only a period corresponding to the OFF period when the ON period and the OFF period are periodically repeated, as shown in FIG. 6.

When it is determined that the synchronization signal is received (step S210; YES), the control circuit 202A returns to step S204, and performs a process (after step S205) when the data is received within the predetermined time or a process (after step S206) when the data is not received within the predetermined time.

(Step S211) The control circuit 202A determines whether or not the detected voltage value is less than the second threshold. The control circuit 202A determines that the secondary battery is in the over-discharged state when the detected voltage value is less than the second threshold, and determines that the secondary battery is not in the over-discharged state when the detected voltage value is equal to or greater than the second threshold. The control circuit 202A proceeds to step S212 when it is determined that the secondary battery is in the over-discharged state (step S211; YES), and returns to step S200 when it is determined that the secondary battery is not in the over-discharged state (step S211; NO).

(Step S212) The control circuit 202A switches to the charging period (the ON period) by switching the switch 203, and performs the charging of the secondary battery 204 without performing the communication. After step S212 is ended, the control circuit 202A returns to step S207, and continues the charging of the secondary battery 204 in a state where the charging period (the ON period) is maintained for the period of time during which the secondary battery 204 is in the over-discharged state.

As discussed above, since the secondary battery 204 is in the over-discharged state, the control circuit 202A proceeds with the charging of the secondary battery 204 in the state where the charging period (the ON period) is maintained. When it is determined that the secondary battery is not in the over-discharged state (step S212; NO), the control circuit returns to step S200 in order to return to the normal operation in which the communication period (the OFF period) and the charging period (the ON period) are repeated, and repeats the above-described process.

The above-described second embodiment, when the mobile phone 10 which is the terminal is a fixed-type system capable of performing transmission and reception to and from the electronic timepiece 20A by facing the electronic timepiece (for example, when the terminal is a time adjustment dedicated-device and adjusts time at the time of getting home), the cycle of the communication period (the OFF period) and the charging period (the ON period) may be, for example, 1 minute. The duration of the synchronization signal in this case may be 1 minute or more.

For example, after the time is adjusted, time data for adjusting the time may be transmitted from the mobile phone 10 which is the terminal at every hour, at several hours, or at a predetermined time such as noon.

As described above, the electronic device (the electronic timepiece 20A) of the present embodiment includes the solar cell 201, the secondary battery 204 that is charged by the solar cell, and the control circuit 202A that switches between the charging period during which the charging of the secondary battery from the solar cell is performed and the communication period during which the optical signal is received by the solar cell at every predetermined time interval. The optical signal includes the synchronization signal indicating the transmission of the data and the data, and the period of the synchronization signal is longer than the charging period.

In the electronic device (the electronic timepiece 20A) of the present embodiment, the control circuit 202A switches from the communication period to the charging period after the data is received during the communication period.

In the electronic device (the electronic timepiece 20A) of the present embodiment, when the data is not received during the communication period, the control circuit 202A switches from the communication period to the charging period after a predetermined amount of time elapses.

The electronic device (the electronic timepiece 20A) of the present embodiment includes the switch 203 that switches the connected state of the solar cell 201 with the secondary battery 204. The control circuit 202A controls the switch such that the secondary battery is disconnected from the solar cell during the communication period, and controls the switch such that the secondary battery is connected to the solar cell during the charging period.

In the electronic device (the electronic timepiece 20A) of the present embodiment, the control circuit 202A detects the voltage value of the secondary battery 204, determines whether or not the detected voltage value is greater than the first threshold, and controls the switch 203 such that the secondary battery is disconnected from the solar cell 201 when it is determined that the detected voltage value is greater than the first threshold.

In the electronic device (the electronic timepiece 20A) of the present embodiment, the control circuit 202A detects the voltage value of the secondary battery 204, determines whether or not the detected voltage value is less than the second threshold, and controls the switch 203 such that the secondary battery is connected to the solar cell 201 when it is determined that the detected voltage value is less than the second threshold.

The electronic device (the electronic timepiece 20A) of the present embodiment includes the generation circuit (the reference signal generating circuit 206) that generates the reference signal for generating time information. When the time information regarding the time is included in the data, the control circuit 202A resets the reference signal based on the received time information.

In the electronic device (the electronic timepiece 20A) of the present embodiment, the period of the optical signal is a cycle of the reference signal.

In the electronic device (the electronic timepiece 20A) of the present embodiment, the control circuit 202A switches between the communication period and the charging period at a predetermined time after the reference signal is reset based on the received time information.

As discussed above, the present embodiment is a communication system (the optical communication system 1A) that includes the electronic device, and the terminal (the mobile phone 10) communicating with the electronic device (the electronic timepiece 20A). The terminal (the mobile phone 10) includes the light source 103, and the transmission control unit 102 that transmits the optical signal including the synchronization signal indicating the transmission of the data and the data to the electronic device by controlling the light emitting state of the light source. The optical signal includes the synchronization signal, and the data, and the duration of the optical signal is the cycle of the reference signal for generating the time information in the electronic device. The electronic device includes the solar cell 201, the secondary battery 204 that is charged by the solar cell, and the control circuit 202A that switches between the charging period during which the charging of the secondary battery from the solar cell is performed and the communication period during which the optical signal is received by the solar cell at every predetermined time interval. The charging period is shorter than the period of the synchronization signal.

According to the second embodiment, since the charging period and the communication period repeated at predetermined cycles are provided and the optical communication is performed by the solar cell 201 during the communication period, it is possible to reduce the number of times the manipulation is performed on the electronic timepiece 20 when the optical communication is, performed. It is possible to perform one-way communication, and thus, it is not necessary to provide a transmission circuit in the electronic timepiece.

According to the second embodiment, since the charging period and the communication period are repeated at predetermined cycles, and the period of the synchronization signal transmitted from the mobile phone 10 (the terminal) is equal to or greater than the charging period (the ON period), the mobile phone 10 and the electronic timepiece 20A are capable of performing asynchronous communication. As a result, since it is possible to perform one-way communication from the mobile phone 10, there is an effect that it is not necessary to provide the transmission circuit which transmits a signal indicating that the synchronization signal is transmitted or is received to or from the electronic timepiece 20A.

Third Embodiment

Hereinafter, a third embodiment of the present invention will be described.

Figure 7:
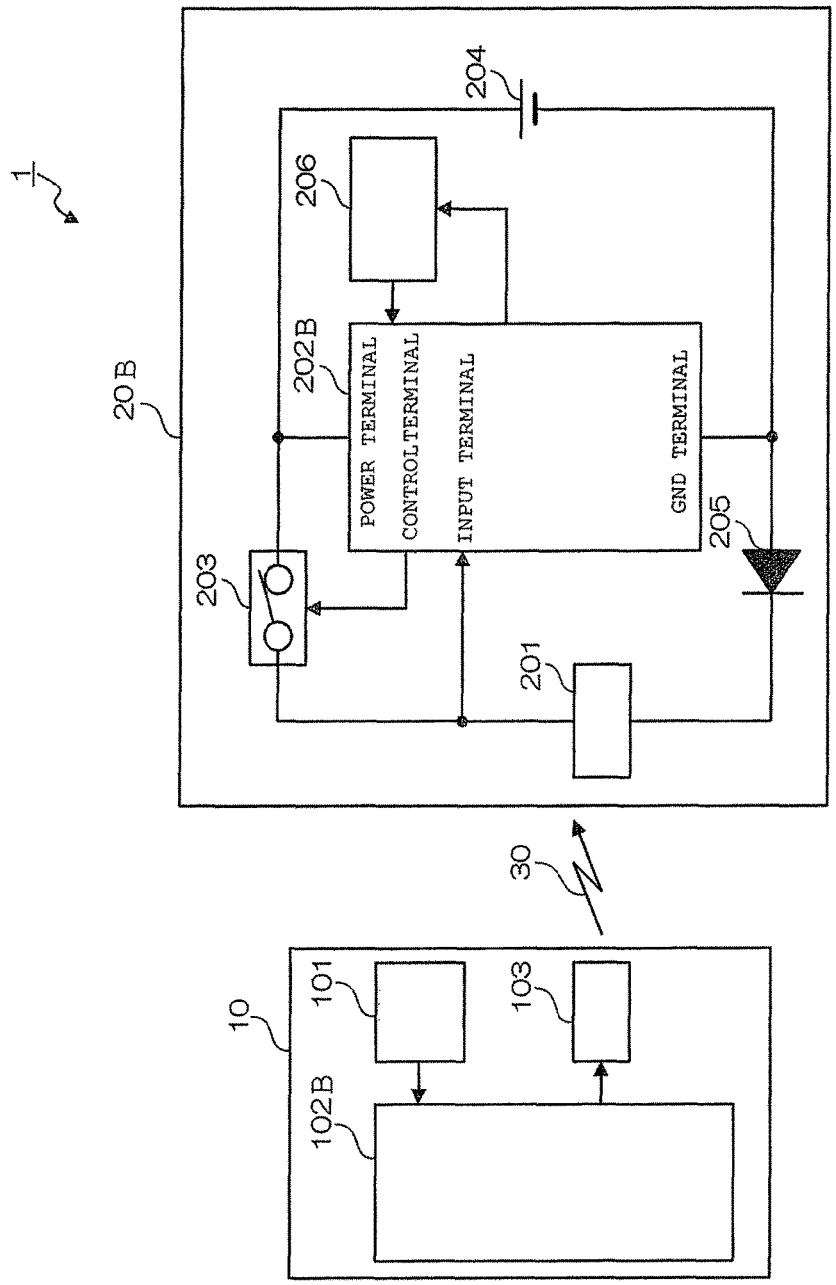
FIG. 7 is a block diagram showing the configurations of a mobile phone and an electronic timepiece of an optical communication system using the electronic timepiece according to third, sixth and ninth embodiments.

FIG. 7 is a block diagram showing the configurations of a mobile phone 10B and an electronic timepiece 20B of an optical communication system 1B using the electronic timepiece 20B according to the third embodiment. The parts corresponding to FIG. 1 will be assigned the same reference numerals, and thus, the description thereof will be omitted.

As shown in FIG. 7, the mobile phone 10B includes a time data obtaining unit 101, a transmission control unit 102B, and a light source 103. The electronic timepiece 20B includes a solar cell 201, a control circuit 202B, a switch 203, a secondary battery 204, a diode 205, and a reference signal generating circuit 206 (a generation circuit).

The control circuit 202B of the electronic timepiece 20B switches between a charging period (an ON period) and a communication period (an OFF period) at predetermined cycles, detects firstly a synchronization signal at a low communication rate during the communication period (the OFF period), switches to a high communication rate (for example, a communication speed which is four times the low communication rate) after the synchronization signal is detected, and receives a start signal and a data signal. Alternatively, the control circuit 202B determines that the synchronization signal is received, and switches to the high communication rate at a timing when the reference signal is switched to L from H. After the data is received at the high communication rate, the control circuit 202B switches from the communication period (the OFF period) to the charging period (the ON period), and returns to the low communication rate. After the synchronization signal is transmitted at the low communication rate, the mobile phone 10B which is the terminal transmits the start signal and the data at the high communication rate. The low communication rate is, for example, 256 Hz and 4 Hz, and the high communication rate is, for example, 1 kHz. The low communication rate is less in power consumption than the high communication rate. That is, the electronic timepiece 20B and the mobile phone 10B of the present embodiment are capable of reducing the power consumption by switching to the low communication rate other than the period of time during which the data is received.

Next, the operation of the third embodiment will be described.

Figure 9:
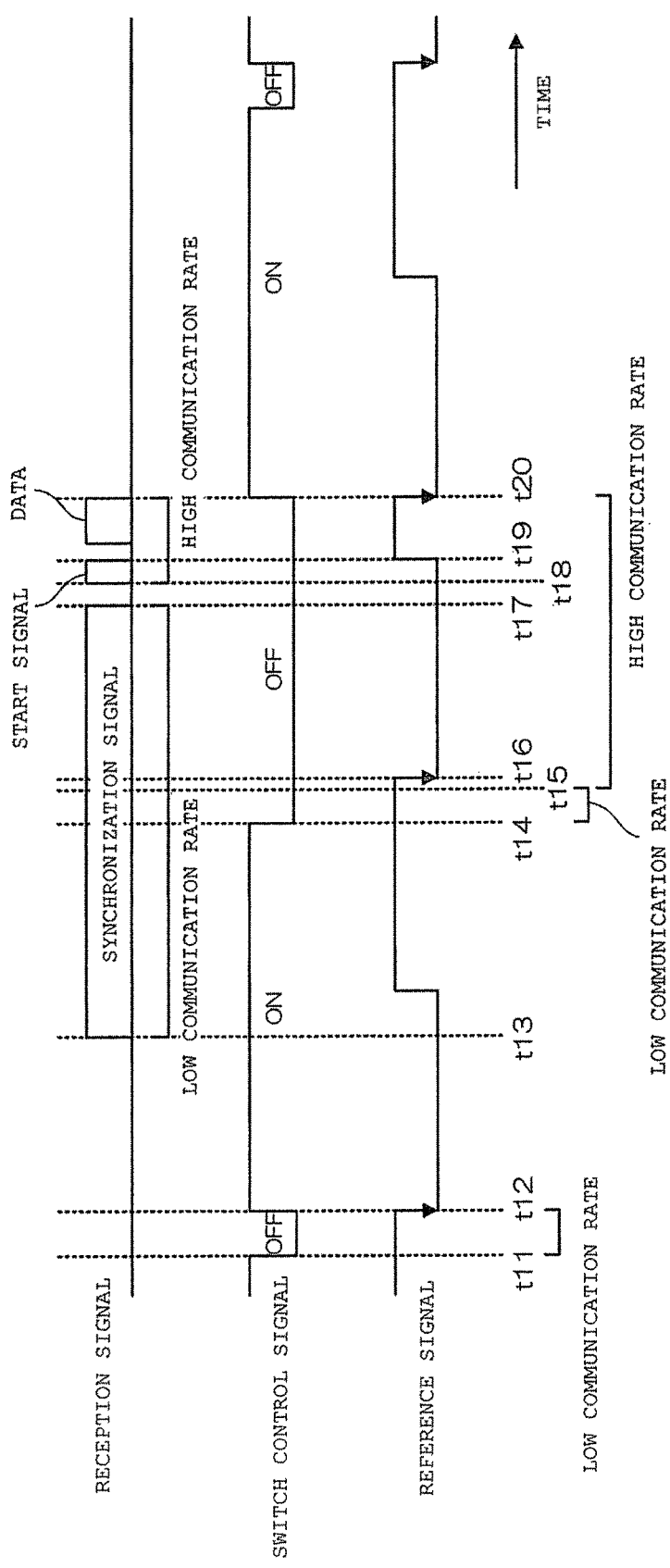
FIG. 9 is a timing chart for describing an operational example of the electronic timepiece according to the third, sixth and ninth embodiments.

FIG. 8 is a flowchart for describing the operation of the electronic timepiece 20B according to the third embodiment. FIG. 9 is a timing chart for describing an operational example of the electronic timepiece 20B according to the third embodiment. In FIG. 9, the topmost part shows a transmission signal output from the mobile phone 10B through the optical communication, that is, a reception signal of the electronic timepiece 20B, the middle part shows a switch control signal for switching between the turn-on state and the turn-off state of the switch 203 by the control circuit 202B of the electronic timepiece 20B, and the bottommost part shows a reference signal generated by the reference signal generating circuit 206 of the electronic timepiece 20B.

The transmission control unit 102B of the mobile phone 10B converts the transmission signal including the time data obtained by the time data obtaining unit 101 into the optical signal to emit the converted optical signal from the light source 103, as shown in the topmost part of FIG. 9. More particularly, the transmission signal includes a synchronization signal, a start signal, and data. For example, the synchronization signal is a signal having a pattern in which a predetermined high level and a predetermined low level are repeated.

The start signal is a signal indicating the start of data. The data is time data. The transmission control unit 102B transmits the synchronization signal at the low communication rate, and transmits the start signal and the data at the high communication rate.

(Step S300) The control circuit 202B of the electronic timepiece 20B firstly sets to be the low communication rate. After step S300 is ended, the control circuit 202B proceeds to a process of step S301.

(Step S301) The control circuit 202B performs the same process as that of step S101 (FIG. 2). As shown in the middle part of FIG. 9, the control circuit 202B outputs the switch control signal having a period of time from t11 to t14 as one cycle (for example, about 1 second). For example, the OFF period is 1/100 of one cycle. After step S301 is ended, the control circuit 202B proceeds to a process of step S302.

(Step S302) The control circuit 202B determines whether or not the current time is the communication period (the OFF period). When it is determined that the current time is the communication period (the OFF period) (step S302; YES), the control circuit 202B proceeds to step S303. When the current time is not the communication period (the OFF period), that is, when the current time is the charging period (the ON period) (step S302; NO), the control circuit 202B returns to step S300. In this case, the charging operation of the secondary battery 204 from the solar cell 201 is continued.

(Step S303) The control circuit 202B determines whether or not the synchronization signal is received from the mobile phone 10B. This step corresponds to an operation at a period of time from t11 to t12 and a period of time from t14 to t16 shown in FIG. 9. When it is determined that the synchronization signal is not received (step S303; NO), the control circuit 202B returns to step S300. That is, when the synchronization signal is not received during the communication period (the OFF period), the control circuit 202B automatically switches to the charging period (the ON period) at the time t12 or the time t16. This step corresponds to the operation of the OFF period at the time from t11 to t12 shown in FIG. 9. In this case, the communication rate is the low communication rate. When it is determined that the synchronization signal is received during the communication period (the OFF period) (step S303; YES), the control circuit 202B proceeds to step S304.

(Step S304) The control circuit 202B maintains the state (OFF) of the switch 203, and switches to the communication period (the OFF period). This step corresponds to an operation after a time t15 shown in FIG. 9. After step S304 is ended, the control circuit 202B proceeds to a process of step S305.

(Step S305) The control circuit 202B sets the communication rate to be the high communication rate. This step corresponds to an operation at the time t15 shown in FIG. 9. After step S305 is ended, the control circuit 202B proceeds to a process of step S306.

(Step S306) The control circuit 202B receives the start signal from the mobile phone 10B at the high communication rate during a period of time from t18 to t19 of the communication period (the OFF period). After step S306 is ended, the control circuit 202B proceeds to a process of step S307.

(Step S307) The control circuit 202B receives the data from the mobile phone 10B at the high communication rate during a period of time from t19 to t20 of the communication period (the OFF period). After step S307 is ended, the control circuit 202B proceeds to a process of step S308.

(Step S308) The control circuit 202B returns to the charging period (the ON period) by switching the switch 203. This corresponds to an operation at the time t20 shown in FIG. 9. Thereafter, the control circuit returns to step S300, switches to the low communication rate, and repeatedly performs the above-described operations.

Although it has been described in the aforementioned example that the control circuit 202B switches from the low communication rate to the high communication rate at the time t15 at which the synchronization signal is detected, the present invention is not limited. For example, the control circuit 202B may switch from the low communication rate to the high communication rate at the time t16 which is the timing when it is determined that the synchronization signal is received and the reference signal is switched from H to L.

First Modification Example of Third Embodiment

Hereinafter, a first modification example of the third embodiment will be described with reference to FIG. 9.

In the first modification example of the third embodiment, the mobile phone 10B which is the terminal transmits, for example, a synchronization signal having different bit patterns of the first half (from t13 to (t17−t13)/2) and the second half (from (t17−t13)/2 to t17) at the low communication rate, and transmits the start signal and the data at the high communication rate in FIG. 9. The electronic timepiece 20B switches between the low communication rate and the high communication rate at a point of time when a change of the bit pattern of the synchronization signal is detected.

The control circuit 202B of the electronic timepiece 20B firstly detects the synchronization signal at the low communication rate during the communication period (the OFF period) (a period of time from t11 to t12 and a period of time from t14 to t16), and maintains the low communication rate (a period of time from t14 to t15) when it is determined that the detected synchronization signal has the bit pattern of the first half. In such a state, the control circuit 202B receives the start signal and the data by switching to the high communication rate at a timing (for example, at the time t15) when it is determined that the detected synchronization signal has the bit pattern of the second half (a period of time from t15 to t20). Thereafter, the control circuit 202B switches from the communication period (the OFF period) to the charging period (the ON period) (a time t20), and further switches to the low communication rate.

For example, when the synchronization signal is started at the time t14, the control circuit 202B includes the start signal and the data at the high communication rate for about one second. The electronic timepiece 20B consumes power corresponding to the high communication rate during this period. For this reason, in the present embodiment, since the low communication rate is maintained when the synchronization signal has the bit pattern of the first half and the communication rate is switched to the high communication rate when the synchronization signal has the bit pattern of the second half, it is possible to reduce the power consumption. Although it has been described in the present embodiment that the synchronization signal has two patterns of the first half and the second half, the pattern may be two or more. For example, when the synchronization signal is transmitted in the order from a first pattern to fourth pattern, the control circuit 202B may maintain the low communication rate when the synchronization signal having the first pattern to the third pattern is received. When the synchronization signal of the fourth pattern is received, the control circuit 202B may switch to the high communication rate.

Second Modification Example of Third Embodiment

Hereinafter, a second modification example of the third embodiment will be described.

Figure 10:
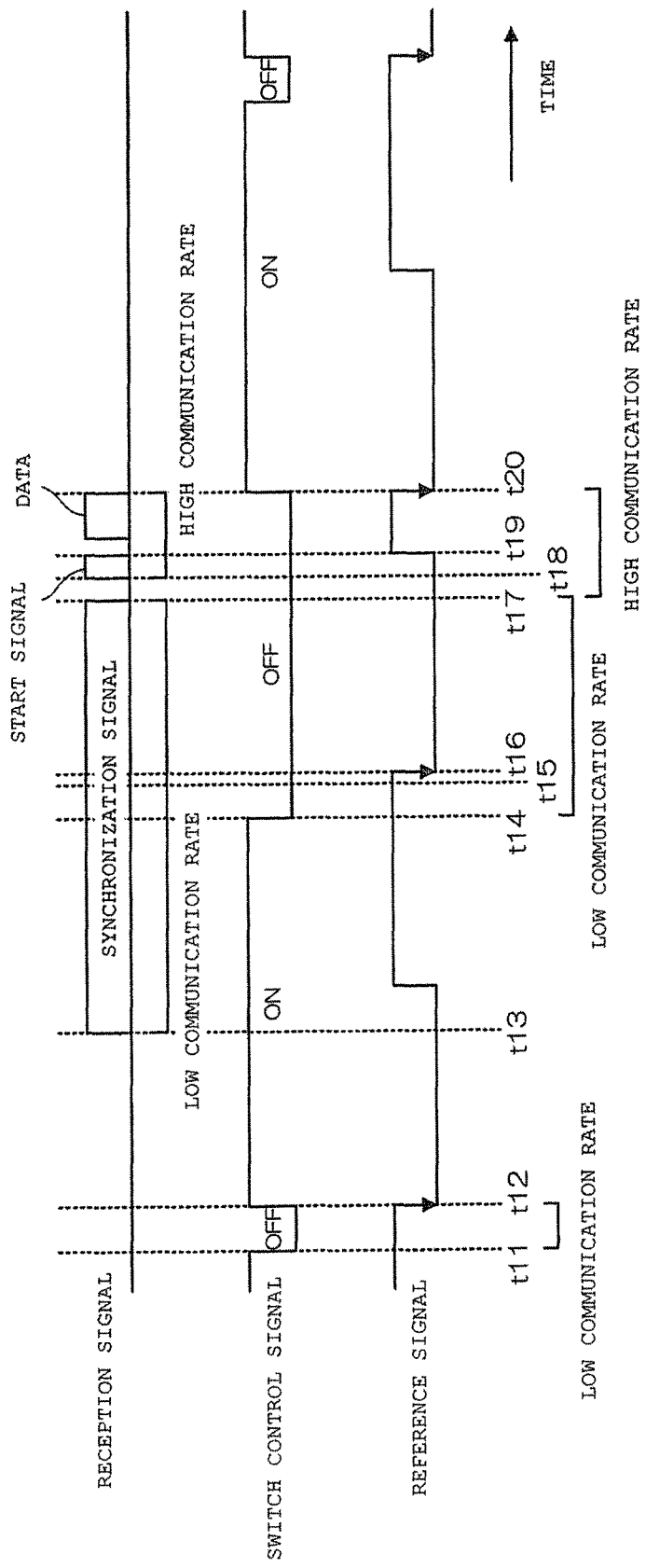
FIG. 10 is a timing chart for describing an operational example of an electronic timepiece according to a second modification example of the third, sixth and ninth embodiments.

FIG. 10 is s timing chart for describing an operational example of the electronic timepiece 20B according to the second modification example of the third embodiment. In FIG. 10, the topmost part shows a transmission signal output from the mobile phone 10B through the optical communication, that is, a reception signal of the electronic timepiece 20B, the middle part shows a switch control signal for switching between the turn-on state and the turn-off state of the switch 203 by the control circuit 202B of the electronic timepiece 20B, and the bottommost part shows a reference signal generated by the reference signal generating circuit 206 of the electronic timepiece 20B.

In the second modification example of the third embodiment, the control circuit 202B of the electronic timepiece 20B switches between the low communication rate and the high communication rate at a point of time when the end bit superimposed on an end of the synchronization signal is detected. That is, the mobile phone 10B which is the terminal transmits the synchronization signal including the end bit at the low communication rate, and transmits the start signal and the data at the high communication rate.

The control circuit 202B of the electronic timepiece 20B firstly detects the synchronization signal at the low communication rate during the communication period (the OFF period), and switches to the high communication rate at a timing (a time t17 of FIG. 10) when it is determined that the end bit of the synchronization signal is detected. Thereafter, the control circuit 202B receives the start signal and the data at the high communication rate (a period of time from t17 to t20 of FIG. 10), switches from the communication period (the OFF period) to the charging period (the ON period) (a time t20 of FIG. 10), and further switches to the low communication rate.

Although it has been described in the present embodiment that the communication rate is switched to the high communication rate at the timing when it is determined that the end bit of the synchronization signal is detected, the present invention is not limited thereto. For example, the control circuit 202B may switch to the high communication rate at a timing when it is determined that the start signal is received.

As stated above, the electronic device (the electronic timepiece 20B) of the present embodiment includes the solar cell 201, the secondary battery 204 that is charged by the solar cell, and the control circuit 202B that switches between the charging period during which the charging of the secondary battery from the solar cell is performed and the communication period during which the optical signal is received by the solar cell at every predetermined time interval. The control circuit receives the synchronization signal which is included in the optical signal and indicates the transmission of the optical signal at a first communication rate (the low communication rate) during the communication period. Thereafter, the control circuit receives the data included in the optical signal by switching to a second communication rate (the high communication rate) faster than the first communication rate.

In the electronic device (the electronic timepiece 20B) of the present embodiment, the control circuit 202B controls such that the optical signal is received at the first communication rate when the period is switched from the charging period to the communication period.

In the electronic device (the electronic timepiece 20B) of the present embodiment, the control circuit 202B switches from the second communication rate to the first communication rate after the data is received.

In the electronic device (the electronic timepiece 20B) of the present embodiment, the control circuit 202B switches to the first communication rate from the second communication rate when the period is switched from the communication period to the charging period.

In the electronic device (the electronic timepiece 20B) of the present embodiment, the control circuit 202B switches from the second communication rate to the first communication rate after a predetermined amount of time elapses when the data is not received during the communication period.

In the electronic device (the electronic timepiece 20B) of the present embodiment, the synchronization signal, the start signal indicating the transmission start of the data, and the data of the optical signal are transmitted in sequence, and the control circuit 202B switches from the first communication rate to the second communication rate when it is determined that the synchronization signal is received.

In the electronic device (the electronic timepiece 20B) of the present embodiment, when information which is included in the synchronization signal and indicates the end of the synchronization signal is received, the control circuit 202B switches from the first communication rate to the second communication rate, and receives the start signal and the data.

In the electronic device (the electronic timepiece 20B) of the present embodiment, the control circuit 202B switches from the first communication rate to the second communication rate when the start signal is received.

In the electronic device (the electronic timepiece 20B) of the present embodiment, the synchronization signal is a signal of which the first half is a first signal pattern and the second half is a second signal pattern. The control circuit 202B controls such that the first communication rate is continued when the synchronization signal having the first signal pattern is received, and switches from the first communication rate to the second communication rate when the synchronization signal having the second signal pattern is received.

In the electronic device (the electronic timepiece 20B) of the present embodiment, at least one of timings when the first communication rate and the second communication rate are started or are ended is a timing synchronized with the reference signal for generating the time information.

According to the third embodiment, since the charging period and the communication period repeated at every predetermined cycle are provided and the optical communication is performed by the solar cell 201 during the communication period, it is possible to reduce the number of times the manipulation is performed on the electronic timepiece 20 when the optical communication is performed. Since the communication rate is switched such that the synchronization signal is detected at the low communication rate and the data is received at the high communication rate, it is possible to reduce the power consumption of the electronic timepiece 20B and the mobile phone 10B.

Fourth Embodiment

Firstly, a fourth embodiment of the present invention will be described.

FIG. 1 is a block diagram showing the configurations of a mobile phone 10 and an electronic timepiece 20 of an optical communication system 1 using the electronic timepiece 20 according to the fourth embodiment. Only the configurations according to the present invention will be illustrated, and other configurations will be omitted.

In FIG. 1, the optical communication system 1 includes the mobile phone 10 and the electronic timepiece 20. The mobile phone 10 includes a time data obtaining unit 101, a transmission control unit 102, and a light source 103.

In the present embodiment, an example in which the mobile phone is used as a device that transmits data will be described. However, as the device that transmits data, a device that includes a light source and is capable of controlling a light emitting state of the light source may be used.

The time data obtaining unit 101 obtains the current time. More particularly, the time data obtaining unit 101 obtains the current time by using any method of a method of obtaining the current time by accessing a time server on the Internet, a method of obtaining the current time using the Global Positioning System (GPS), and a method of obtaining the current time from a control signal from a base station.

For example, the transmission control unit 102 converts time data obtained by the time data obtaining unit 101 into an optical signal to emit the converted optical signal from the light source 103 in response to the manipulation of a user. As will be described below, examples of the optical signal include a synchronization signal, a start signal, and time data. The transmission control unit 102 emits the optical signal by controlling the turn-on and turn-off of the light source 103.

The light source 103 includes a light-emitting diode (LEDs) for a flash included in the mobile phone 10, and a backlight of a liquid crystal panel. Light emitted from the light source 103 is light having a wavelength which is received as a signal by a solar cell 201 included in the electronic timepiece 20 and generates a power, and is, for example, white light.

The electronic timepiece 20 includes the solar cell 201, a control circuit 202, a switch 203, a secondary battery 204, a diode 205, and a reference signal generating circuit 206 (a generation circuit).

The solar cell 201 functions as a power generator that receives light from an external light source (sun or illumination) and converts the received light into electric energy during a charging period, and functions as a light receiver for performing optical communication with the mobile phone 10 during a communication period. The charging period and the communication period will be described below.

The control circuit 202 controls the charging of the secondary battery 204 using the solar cell 201, prevents overcharging of the secondary battery 204, or controls the optical communication using the solar cell 201. More specifically, the control circuit 202 is operated by an electric power from the secondary battery 204 connected to a power terminal and a GND terminal, and determines a charged state (a fully charged state or an over-discharged state) of the secondary battery 204 by detecting an output voltage of the secondary battery, and performs predetermined charging control. That is, by controlling the turn-on state and the turn-off state of the switch 203 by a control signal output from a control terminal depending on the charged state of the secondary battery 204, the control circuit 202 charges the secondary battery 204 by connecting the solar cell 201 with the secondary battery 204, and prevents the overcharging of the secondary battery 204 by disconnecting the solar cell from the secondary battery.

The control circuit 202 switches between the connection (a charging period: an ON period, a period of time during which communication is not performed) of the solar cell 201 with the secondary battery 204 and the disconnection (a communication period: an OFF period, a period of time during which charging is not performed) of the solar cell 201 from the secondary battery 204 by controlling the turn-on state or the turn-off state of the switch 203 by a switch control signal, based on a reference signal and a signal oscillated from the reference signal generating circuit 206.

The control circuit 202 receives time data transmitted from an external device (in this case, the mobile phone 10) through the optical communication by detecting an output voltage of the solar cell 201 input to the input terminal and converting the detected voltage into an electrical signal during the communication period. Although it has been described in the present embodiment that the time data is transmitted as the data from the mobile phone 10, the present invention is not limited thereto, but another type of data may be used. The control circuit 202 detects a synchronization signal, to be described below, by using a frequency-divided signal input from the reference signal generating circuit 206.

The switch 203 switches between the connection (the charging period) of the solar cell 201 with the secondary battery 204 and the disconnection (the communication period) of the solar cell 201 from the secondary battery 204 in response to the switch control signal from the control circuit 202.

The diode 205 prevents the backflow of a charging current toward the solar cell 201.

The reference signal generating circuit 206 includes an oscillation circuit (for example, 32 kHz) and a frequency-dividing circuit, and generates a reference signal of, for example, 1 Hz. The reference signal generating circuit 206 divides an oscillated signal of 32 kHz, and generates a frequency-divided signal of a frequency corresponding to a communication rate, to be described below. The reference signal generating circuit 206 outputs the generated frequency-divided signal and the generated reference signal to the control circuit 202.

Next, the operation of the fourth embodiment will be described.

FIG. 2 is a flowchart for describing the operation of the electronic timepiece 20 according to the fourth embodiment. FIG. 3 is a timing chart for describing an operational example of the electronic timepiece 20 according to the fourth embodiment. In FIG. 3, the topmost part shows a transmission signal output from the mobile phone 10 through the optical communication, that is, a reception signal of the electronic timepiece 20, the middle part shows a switch control signal for switching between the turn-on state and the turn-off state of the switch 203 by the control circuit 202 of the electronic timepiece 20, and the bottommost part shows a reference signal generated by the reference signal generating circuit 206 of the electronic timepiece 20.

The transmission control unit 102 of the mobile phone 10 converts the transmission signal including the time data obtained by the time data obtaining unit 101 into the optical signal to emit the converted optical signal from the light source 103, as shown in the topmost part of FIG. 3. More particularly, the transmission signal includes a synchronization signal, a start signal, and data. The start signal is a signal indicating the start of data. The data is, for example, time data. In FIG. 3, one cycle of the reference signal is a period of time from t2 to t5, and is, for example, one second.

Hereinafter, the synchronization signal will be described. The synchronization signal is a pattern in which a predetermined H (turn-on) state and a predetermined L (turn-off) state are continuously repeated multiple times, and is, for example, HLHL . . . , or HLLHLL . . . . For example, the detection of the synchronization signal is performed by detecting a pattern of HLHL. When the synchronization signal is detected, if a person shades the solar cell 201 with their hand or passes in front of the solar cell 201, a pattern of HLH may be artificially generated. For this reason, a period of time from t1 to t2 shown in FIG. 3, that is, the communication period (the OFF period) is set to be greater than the time capable of detecting the pattern of the synchronization signal HLHL.

(Step S100) In the electronic timepiece 20, the control circuit 202 firstly controls the communication period (the OFF period) and the charging period (the ON period) by switching the switch 203 by using the switch control signal. As shown in the middle part of FIG. 3, the control circuit 202 outputs the switch control signal having a period of time from t1 to t3 as one cycle (for example, about 1 second). For example, the OFF period of a period of time from t1 to t2 is $1/100$ of one cycle, and the ON period of a period of time from t2 to t3 is $99/100$ of one cycle. After step S100 is ended, the control circuit 202 proceeds to a process of step S101.

(Step S101) The control circuit 202 determines whether or not the current time is the communication period (the OFF period). When the current time is not the communication period (the OFF period), that is, when it is determined that the current time is the charging period (the ON period) (step S101; NO), the control circuit 202 returns to step S100. In this case, the charging operation of the secondary battery 204 from the solar cell 201 is continued. When it is determined that the current time is the communication period (the OFF period), that is, when it is determined that the current time is the charging period (the ON period) (step S101; YES), the control circuit 202 proceeds to step S102.

(Step S102) The control circuit 202 determines whether or not the synchronization signal is received from the mobile phone 10 during the OFF periods of a period of time from t1 to t2 and a period of time from t3 to t5. When it is determined that the synchronization signal is not received (step S102; NO), the control circuit 202 returns to step S100. That is, when the synchronization signal is not received during the communication period (the OFF period), the control circuit 202 automatically switches to the charging period (the ON period) at the time t2 or the time t5. When it is determined that the synchronization signal is received during the communication period (the OFF period) (step S102; YES), the control circuit 202 proceeds to step S103.

(Step S103) The control circuit 202 maintains the state (OFF) of the switch 203, and switches to the communication period (the OFF period). In the example shown in FIG. 3, the control circuit 202 determines that the synchronization signal is received at the time t4, and maintains the state (OFF) of the switch 203 until the reception of the data is ended after the time t4. After step S103 is ended, the control circuit 202 proceeds to a process of step S104.

(Step S104) The control circuit 202 receives the start signal transmitted from the mobile phone 10 during the communication period (the OFF period). After step S104 is ended, the control circuit 202 proceeds to a process of step S105.

(Step S105) The control circuit 202 receives the data transmitted from the mobile phone 10. After step S105 is ended, the control circuit 202 proceeds to a process of step S106.

(Step S106) After the data is received, the control circuit 202 returns to the charging period (the ON period) by switching the switch 203. This step corresponds to an operation at a time t6 shown in FIG. 3. Thereafter, the control circuit 202 returns to the process of step S100, and repeatedly performs the above-described operations.

When the received data is the time data, the control circuit 202 may reset the reference signal (for example, 1 Hz) generated by the reference signal generating circuit 206. The reset corresponds to the reference signal at the time t6 shown in FIG. 3. The reference signal has the time from t2 to t5 as one cycle and is a signal of which the next cycle starts at the time t5. At the time from t2 to t5, a period of a low level and a period of a high level are the same period of time. Meanwhile, at the time from t5 to t6, since the signal is reset in the middle of the period of the high level, the period of the high level is shorter than the period of the low level.

As mentioned previously, the switch 203 serves as a switch for preventing the overcharging of the secondary battery 204. For this reason, the control circuit 202 detects a voltage value of the secondary battery 204, and determines whether or not the detected voltage value is a voltage value in the fully-charged state. When it is determined that the detected voltage value is the voltage value in the fully-charged state, the control circuit 202 switches to the turn-off state of the switch 203, and does not perform the charging of the secondary battery 204. In this case, the switch control signal maintains the turn-off state.

The control circuit 202 may constantly detect the synchronization signal for a period of time during which the turn-off state is maintained. Alternatively, since the power consumption of the control circuit 202 is increased when the synchronization signal is constantly detected, even though the turn-off state is maintained due to such a reason, the control circuit 202 may detect the synchronization signal for only a period corresponding to the OFF period when the ON period and the OFF period are periodically repeated, as shown in FIG. 3.

As stated above, the electronic device (the electronic timepiece 20) of the present embodiment includes the solar cell 201, the secondary battery 204 that is charged by the solar cell, and the control circuit 202 that switches between the charging period during which the charging of the secondary battery from the solar cell is performed and the communication period during which the optical signal is received by the solar cell at every predetermined time interval.

The electronic device (the electronic timepiece 20) of the present embodiment includes the switch 203 that switches the connected state of the solar cell 201 with the secondary battery 204. The control circuit 202 controls the switch such that the secondary battery is disconnected from the solar cell during the communication period, and controls the switch such that the secondary battery is connected to the solar cell during the charging period.

In the electronic device (the electronic timepiece 20) of the present embodiment, the control circuit 202 detects the voltage value of the secondary battery 204, determines whether or not the detected voltage value is greater than a first threshold, and controls the switch 203 such that the secondary battery is disconnected from the solar cell 201 when it is determined that the detected voltage value is greater than the first threshold.

In the electronic device (the electronic timepiece 20) of the present embodiment, the control circuit 202 detects the voltage value of the secondary battery 204, determines whether or not the detected voltage value is less than a second threshold, and controls the switch 203 such that the secondary battery is connected to the solar cell 201 when it is determined that the detected voltage value is less than the second threshold.

The method of controlling the electronic device of the present embodiment includes a control procedure of causing the control circuit 202 to switch between the charging period during which the charging of the secondary battery 204 from the solar cell 201 is performed and the communication period during which the optical signal is received by the solar cell at every predetermined time interval.

In such a configuration, according to the fourth embodiment, since the charging period and the communication period repeated at predetermined cycles are provided and the optical communication is performed by the solar cell 201 during the communication period, the electronic timepiece 20 performs the optical communication without switching to a communication mode through the manipulation of the user on the electronic timepiece 20.

As a result, in the electronic timepiece 20 of the present embodiment, it is possible to reduce the number of times the manipulation is performed on the electronic timepiece 20 when the communication is performed.

For the period of time during which the optical signal is received, when the solar cell 201 and the secondary battery 204 are connected, the optical signal detected by the control circuit 202 is affected by the voltage value of the secondary battery 204 in some cases. For example, when the level of the optical signal is lower than the voltage of the secondary battery 204, the optical signal as an output of the solar cell 201 may be drawn by the voltage of the secondary battery 204, and thus, the control circuit 202 has difficulty distinguishing between the optical signal and external disturbance light. For this reason, when the solar cell 201 and the secondary battery 204 are connected for the period of time during which the optical signal is received, reception accuracy is degraded in some cases. Accordingly, according to the fourth embodiment, it is possible to improve the reception accuracy by disconnecting the solar cell 201 from the secondary battery 204 for a period of time during which the optical communication is performed.

Fifth Embodiment

Next, a fifth embodiment of the present invention will be described.

FIG. 4 is a block diagram showing the configurations of a mobile phone 10 and an electronic timepiece 20A of an optical communication system 1A using the electronic timepiece 20A according to the fifth embodiment. The parts corresponding to FIG. 1 will be assigned the same reference numerals, and thus, the description thereof will be omitted.

As shown in FIG. 4, the mobile phone 10 includes a time data obtaining unit 101, a transmission control unit 102, and a light source 103. The electronic timepiece 20A includes a solar cell 201, a control circuit 202A, a switch 203, a secondary battery 204, a diode 205, and a reference signal generating circuit 206 (a generation circuit).

In FIG. 4, the control circuit 202A of the electronic timepiece 20A may switch between a charging period (an ON period) and a communication period (an OFF period) at predetermined cycles, may receive a synchronization signal during the communication period (the OFF period), and may control the switch 203 depending on a charged state (a fully-charged state or an over-discharged state) of the secondary battery when data is not received within a predetermined time, and may set the charging period (the ON period) and the communication period (the OFF period).

By controlling the switch 203 between the turn-on state and the turn-off state by a control signal output from a control terminal depending on the charging state of the secondary battery 204, the control circuit 202A performs the charging of the secondary battery 204 by connecting the solar cell 201 with the secondary battery 204, and prevents the overcharging of the secondary battery 204 by disconnecting the solar cell from the secondary battery. The control circuit 202A detects a voltage value of the secondary battery 204, and determines whether or not the detected voltage value is greater than a first threshold. When it is determined that the detected voltage value is greater than the first threshold, the control circuit 202A prevents the overcharging by controlling the switch 203 to enter the turn-off state such that the secondary battery 204 is disconnected from the solar cell 201.

The control circuit 202A prevents the over-discharging of the secondary battery 204 by controlling the switch 203 between the turn-on state and the turn-off state by the control signal output from the control terminal depending on the charged state of the secondary battery 204. The control circuit 202A detects the voltage value of the secondary battery 204, and determines whether or not the detected voltage value is smaller than a second threshold. When it is determined that the detected voltage value is smaller than the second threshold, the control circuit 202A prevents the over-discharging by controlling the switch 203 to enter the turn-on state such that the secondary battery 204 is connected to the solar cell 201.

In the fifth embodiment, the mobile phone 10 transmits the synchronization signal for a period longer than the charging period (the ON period) in the electronic timepiece 20A. When the rising of the charging period (the ON period) and the start of the synchronization signal occur simultaneously, the synchronization signal is not detected by the electronic timepiece 20A in some cases when the rising of the synchronization signal and the charging period (the ON period) are the same. When a cycle of the charging period (the ON period) and the communication period (the OFF period) is one second, it is preferable that the synchronization signal is, for example, one second or more. The duration of the synchronization signal may be changed by the user. For example, when the synchronization signal is not detected at an initial value, the duration of the synchronization signal may be set by the user so as to be lengthened.

Next, the operation of the fifth embodiment will be described.

FIG. 5 is a flowchart for describing the operation of the electronic timepiece 20A according to the fifth embodiment. FIG. 6 is a timing chart for describing an operational example of the electronic timepiece 20A according to the fifth embodiment. In FIG. 6, the topmost part shows a transmission signal output from the mobile phone 10 through the optical communication, that is, a reception signal of the electronic timepiece 20A, the middle part shows a switch control signal for switching between the turn-on state and the turn-off state of the switch 203 by the control circuit 202A of the electronic timepiece 20A, and the bottommost part shows a reference signal generated by the reference signal generating circuit 206 of the electronic timepiece 20A.

The transmission control unit 102 of the mobile phone 10 converts the transmission signal including the time data obtained by the time data obtaining unit 101 into the optical signal to emit the converted optical signal from the light source 103, at a time t13 as shown in the topmost part of FIG. 6. More particularly, the transmission signal includes a synchronization signal, a start signal, and data. For example, the synchronization signal is a signal having a pattern in which a predetermined high level and a predetermined low level are repeated.

As stated above, it is preferable that the duration of the synchronization signal is longer than the charging period (the ON period, a period of time from t12 to t14). FIG. 6 shows an example in which, for example, H of the synchronization signal is detected at the time t14 and the detection of the synchronization signal is ended at a timing of a time t15.

The start signal is a signal indicating the start of data. The data is time data. The data includes a second reset bit, and an end bit. Here, the second reset bit refers to a bit indicating a timing when the reference signal is reset, and the end bit refers to a bit indicating the end of the data.

(Steps S200 to S202) The control circuit 202A of the electronic timepiece 20A performs processes of steps S201 and S202, similarly to steps S100 to S102 (FIG. 2). After step S202 is ended, the control circuit 202A proceeds to a process of step S203.

(Step S203) The control circuit 202A maintains the state (OFF) of the switch 203, and switches to the communication period (the OFF period). This step corresponds to an operation after the time t15 shown in FIG. 6. After step S203 is ended, the control circuit 202A proceeds to a process of step S204.

(Step S204) The control circuit 202A determines whether or not data is received within a predetermined time. The control circuit 202A proceeds to step S205 when the data is received within the predetermined time (step S204; YES), and proceeds to step S206 when the data is not received within the predetermined time (step S204; NO).

(Step S205) After the data is received from the mobile phone 10, the control circuit 202A returns to the charging time (the ON period) by switching the switch 203, and returns to step S200, similarly to step S106 (FIG. 2). This step corresponds to an operation at a time t20 shown in FIG. 6.

The control circuit may return to the charging time (the ON period) when the end bit of the data is received, or after the data is received. When the second reset bit included in the data is detected, the control circuit 202A resets the reference signal of the reference signal generating circuit 206 (the time t20). For this reason, the timing when the switch control signal represented by the time t20 of FIG. 6 is switched from the OFF state to the ON state and the timing when the reference signal is reset may not be necessarily equal to each other.

(Step S206) The control circuit 202A switches to the charging period (the ON period) by switching the switch 203. That is, when the synchronization signal is received but the data is not received, the control circuit 202A determines that some communication errors occur, for example, a direction of the light source of the mobile phone 10 is changed, and stops a communication operation (a reception operation) in which power consumption is high. After step S207 is ended, the control circuit 202A proceeds to a process of step S208.

(Step S207) The control circuit 202A detects the voltage value of the secondary battery 204. After step S207 is ended, the control circuit 202A proceeds to a process of step S208.

(Step S208) The control circuit 202A determines whether or not the detected voltage value is greater than the first threshold. The control circuit 202A determines that the secondary battery is in the fully-charged state when the detected voltage value is greater than the first threshold, and determines that the secondary battery is not in the fully-charged state when the detected voltage value is equal to or less than the first threshold. The control circuit 202A proceeds to step S209 when it is determined that the secondary battery is in the fully-charged state (step S208; YES), and proceeds to step S211 when the secondary battery is not in the fully-charged state (step S208; NO).

(Step S209) The control circuit 202A switches to the communication period (the OFF period) by switching the switch 203, and does not perform the charging of the secondary battery 204. After step S209 is ended, the control circuit 202A proceeds to a process of step S210.

(Step S210) The control circuit 202A determines whether or not the synchronization signal is received from the mobile phone 10 (the terminal). When it is determined that the synchronization signal is not received (step S210; NO), the control circuit 202A returns to step S207, and detects that the synchronization signal is received from the mobile phone 10 in a state where the communication period (the OFF period) is maintained for a period of time during which the secondary battery 204 is fully charged.

In this case, since the power consumption of the control circuit 202A is increased when the synchronization signal is constantly detected, even though the communication period (the OFF period) is maintained, the control circuit 202A may detect the synchronization signal for only a period corresponding to the OFF period when the ON period and the OFF period are periodically repeated, as shown in FIG. 6.

When it is determined that the synchronization signal is received (step S210; YES), the control circuit 202A returns to step S204, and performs a process (after step S205) when the data is received within the predetermined time or a process (after step S206) when the data is not received within the predetermined time.

(Step S211) The control circuit 202A determines whether or not the detected voltage value is less than the second threshold. The control circuit 202A determines that the secondary battery is in the over-discharged state when the detected voltage value is less than the second threshold, and determines that the secondary battery is not in the over-discharged state when the detected voltage value is equal to or greater than the second threshold. The control circuit 202A proceeds to step S212 when it is determined that the secondary battery is in the over-discharged state (step S211; YES), and returns to step S200 when it is determined that the secondary battery is not in the over-discharged state (step S211; NO).

(Step S212) The control circuit 202A switches to the charging period (the ON period) by switching the switch 203, and performs the charging of the secondary battery 204 without performing the communication. After step S212 is ended, the control circuit 202A returns to step S207, and continues the charging of the secondary battery 204 in a state where the charging period (the ON period) is maintained for the period of time during which the secondary battery 204 is in the over-discharged state.

As discussed above, since the secondary battery 204 is in the over-discharged state, the control circuit 202A proceeds with the charging of the secondary battery 204 in the state where the charging period (the ON period) is maintained. When it is determined that the secondary battery is not in the over-discharged state (step S212; NO), the control circuit returns to step S200 in order to return to the normal operation in which the communication period (the OFF period) and the charging period (the ON period) are repeated, and repeats the above-described process.

The above-described fifth embodiment, when the mobile phone 10 which is the terminal is a fixed-type system capable of performing transmission and reception to and from the electronic timepiece 20A by facing the electronic timepiece (for example, when the terminal is a time adjustment dedicated device and adjusts time at the time of getting home), the cycle of the communication period (the OFF period) and the charging period (the ON period) may be, for example, 1 minute. The duration of the synchronization signal in this case may be 1 minute or more.

For example, after the time is adjusted, time data for adjusting the time may be transmitted from the mobile phone 10 which is the terminal at every hour, at several hours, or at a predetermined time such as noon.

As described above, the electronic device (the electronic timepiece 20A) of the present embodiment includes the solar cell 201, the secondary battery 204 that is charged by the solar cell, and the control circuit 202A that switches between the charging period during which the charging of the secondary battery from the solar cell is performed and the communication period during which the optical signal is received by the solar cell at every predetermined time interval. The optical signal includes the synchronization signal indicating the transmission of the data and the data, and the period of the synchronization signal is longer than the charging period.

As discussed above, the present embodiment is a communication system (the optical communication system 1A) that includes the electronic device, and (the mobile phone 10) communicating with the electronic device (the electronic timepiece 20A). (The mobile phone 10) includes the light source 103, and the transmission control unit 102 that transmits the optical signal including the synchronization signal indicating the transmission of the data and the data to the electronic device by controlling the light emitting state of the light source. The optical signal includes the synchronization signal, and the data, and the duration of the optical signal is the cycle of the reference signal for generating the time information in the electronic device. The electronic device includes the solar cell 201, the secondary battery 204 that is charged by the solar cell, and the control circuit 202A that switches between the charging period during which the charging of the secondary battery from the solar cell is performed and the communication period during which the optical signal is received by the solar cell at every predetermined time interval. The charging period is shorter than the period of the synchronization signal.

According to the fifth embodiment, since the charging period and the communication period repeated at predetermined cycles are provided and the optical communication is performed by the solar cell 201 during the communication period, it is possible to reduce the number of times the manipulation is performed on the electronic timepiece 20 when the optical communication is performed. It is possible to perform one-way communication, and thus, it is not necessary to provide a transmission circuit in the electronic timepiece.

According to the fifth embodiment, since the charging period and the communication period are repeated and the period of the synchronization signal transmitted from the mobile phone 10 (the terminal) is equal to or greater than the charging period (the ON period), the mobile phone 10 and the electronic timepiece 20A are capable of performing asynchronous communication. As a result, since it is possible to perform one-way communication from the mobile phone 10, there is an effect that it is not necessary to provide the transmission circuit which transmits a signal indicating that the synchronization signal is transmitted or is received to or from the electronic timepiece 20A.

According to the fifth embodiment, since the period is returns to the reception period from the communication period after the data included in the optical signal is received, it is possible to efficiently charge the secondary battery when the communication is not performed.

According to the fifth embodiment, even when the synchronization signal is not received, when the data is not received within the predetermined time, since the period is returned to the reception period from the communication period, it is possible to reduce the period of time during which the charging is not performed.

According to the fifth embodiment, when the voltage value of the secondary battery is greater than the first threshold, since the solar cell 201 is disconnected from the secondary battery 204, it is possible to prevent the overcharging of the secondary battery 204.

According to the fifth embodiment, when the voltage value of the secondary battery is less than the second threshold, since the solar cell 201 is connected to the secondary battery 204, it is possible to prevent the over-discharging of the secondary battery 204.

It is preferable that the voltage value of the secondary battery 204 is detected during the charging period.

According to the fifth embodiment, when the reception data is the time data, since the reference signal of the electronic timepiece 20A is reset based on the received data, the electronic timepiece 20A is capable of automatically perform the time adjustment based on the received data.

According to the fifth embodiment, since the cycle of the optical signal (the synchronization signal, the start signal and the data) is the cycle of the reference signal of the electronic timepiece 20A, the electronic timepiece 20A is capable of switching between the communication period and the charging period based on the reference signal.

According to the fifth embodiment, the time of the electronic timepiece 20A is not greatly deviated after the time adjustment is performed. For this reason, even though the mobile phone 10 transmits the optical signal at every one second, since the electronic timepiece 20A switches between the communication period and the charging period at a predetermined time, receives the data, and performs the time adjustment, it is possible to reduce the power consumption of the electronic timepiece 20A, and it is possible to lengthen the charging period. The predetermined time is, for example, every hour, or a predetermined time (for example, at noon) in a day.

Sixth Embodiment

Hereinafter, a sixth embodiment of the present invention will be described.

FIG. 7 is a block diagram showing the configurations of a mobile phone 10B and an electronic timepiece 20B of an optical communication system 1B using the electronic timepiece 20B according to the sixth embodiment. The parts corresponding to FIG. 1 will be assigned the same reference numerals, and thus, the description thereof will be omitted.

As shown in FIG. 7, the mobile phone 10B includes a time data obtaining unit 101, a transmission control unit 102B, and a light source 103. The electronic timepiece 20B includes a solar cell 201, a control circuit 202B, a switch 203, a secondary battery 204, a diode 205, and a reference signal generating circuit 206 (a generation circuit).

The control circuit 202B of the electronic timepiece 20B switches between a charging period (an ON period) and a communication period (an OFF period) at predetermined cycles, detects firstly a synchronization signal at a low communication rate during the communication period (the OFF period), switches to a high communication rate (for example, four times the low communication rate) after the synchronization signal is detected, and receives a start signal and a data signal. Alternatively, the control circuit 202B determines that the synchronization signal is received, and switches to the high communication rate at a timing when the reference signal is switched to L from H. After the data is received at the high communication rate, the control circuit 202B switches from the communication period (the OFF period) to the charging period (the ON period), and returns to the low communication rate.

After the synchronization signal is transmitted at the low communication rate, the mobile phone 10B which is the terminal transmits the start signal and the data at the high communication rate. The low communication rate is less in power consumption than the high communication rate. That is, the electronic timepiece 20B and the mobile phone 10B of the present embodiment are capable of reducing the power consumption by switching to the low communication rate other than the period of time during which the data is received.

Next, the operation of the sixth embodiment will be described.

FIG. 8 is a flowchart for describing the operation of the electronic timepiece 20B according to the sixth embodiment. FIG. 9 is a timing chart for describing an operational example of the electronic timepiece 20B according to the sixth embodiment. In FIG. 9, the topmost part shows a transmission signal output from the mobile phone 10B through the optical communication, that is, a reception signal of the electronic timepiece 20B, the middle part shows a switch control signal for switching between the turn-on state and the turn-off state of the switch 203 by the control circuit 202B of the electronic timepiece 20B, and the bottommost part shows a reference signal generated by the reference signal generating circuit 206 of the electronic timepiece 20B.

The transmission control unit 102B of the mobile phone 10B converts the transmission signal including the time data obtained by the time data obtaining unit 101 into the optical signal to emit the converted optical signal from the light source 103, as shown in the topmost part of FIG. 9. More particularly, the transmission signal includes a synchronization signal, a start signal, and data. For example, the synchronization signal is a signal having a pattern in which a predetermined high level and a predetermined low level are repeated.

The start signal is a signal indicating the start of data. The data is time data.

(Step S300) The control circuit 202B of the electronic timepiece 20B firstly sets to be the low communication rate. After step S300 is ended, the control circuit 202B proceeds to a process of step S301.

(Step S301) The control circuit 202B performs the same process as that of step S101 (FIG. 2). As shown in the middle part of FIG. 9, the control circuit 202B outputs the switch control signal having a period of time from t11 to t14 as one cycle (for example, about 1 second). For example, the OFF period is 1/100 of one cycle. After step S301 is ended, the control circuit 202B proceeds to a process of step S302.

(Step S302) The control circuit 202B determines whether or not the current time is the communication period (the OFF period). When it is determined that the current time is the communication period (the OFF period) (step S302; YES), the control circuit 202B proceeds to step S303. When the current time is not the communication period (the OFF period), that is, when the current time is the charging period (the ON period) (step S302; NO), the control circuit 202B returns to step S300. In this case, the charging operation of the secondary battery 204 from the solar cell 201 is continued.

(Step S303) The control circuit 202B determines whether or not the synchronization signal is received from the mobile phone 10B. This step corresponds to an operation at a period of time from t11 to t12 and a period of time from t14 to t16 shown in FIG. 9. When it is determined that the synchronization signal is not received (step S303; NO), the control circuit 202B returns to step S300. That is, when the synchronization signal is not received during the communication period (the OFF period), the control circuit 202B automatically switches to the charging period (the ON period) at the time t12 or the time t16. This step corresponds to the operation of the OFF period at the time from t11 to t12 shown in FIG. 9. In this case, the communication rate is the low communication rate. When it is determined that the synchronization signal is received during the communication period (the OFF period) (step S303; YES), the control circuit 202B proceeds to step S304.

(Step S304) The control circuit 202B maintains the state (OFF) of the switch 203, and switches to the communication period (the OFF period). This step corresponds to an operation of a period of time from t14 to t15 shown in FIG. 9. In this case, the communication rate is the low communication rate. After step S304 is ended, the control circuit 202B proceeds to a process of step S305.

(Step S305) The control circuit 202B sets the communication rate to be the high communication rate. This step corresponds to an operation at the time t15 shown in FIG. 9. Alternatively, the control circuit 202B may switch to the high communication rate from the low communication rate at a time t16 which is a timing when it is determined that the synchronization signal is received and the reference signal is switched from H to L. After step S305 is ended, the control circuit 202B proceeds to a process of step S306.

(Step S306) The control circuit 202B receives the start signal from the mobile phone 10B at the high communication rate during a period of time from t18 to t19 of the communication period (the OFF period). After step S306 is ended, the control circuit 202B proceeds to a process of step S307.

(Step S307) The control circuit 202B receives the data from the mobile phone 10B at the high communication rate during a period of time from t19 to t20 of the communication period (the OFF period). After step S307 is ended, the control circuit 202B proceeds to a process of step S308.

(Step S308) The control circuit 202B returns to the charging period (the ON period) by switching the switch 203. This corresponds to an operation at the time t20 shown in FIG. 9. Thereafter, the control circuit returns to step S300, switches to the low communication rate, and repeatedly performs the above-described operations.

Although it has been described in the aforementioned example that the control circuit 202B switches from the low communication rate to the high communication rate at the time t15 at which the synchronization signal is detected, the present invention is not limited. For example, the control circuit 202B may switch from the low communication rate to the high communication rate at the time t16 which is a dropping timing of the reference signal.

(First Modification Example of Sixth Embodiment)

Hereinafter, a first modification example of the sixth embodiment will be described with reference to FIG. 9.

In the first modification example of the sixth embodiment, the mobile phone 10B which is the terminal transmits, for example, a synchronization signal having different bit patterns of the first half (from t13 to (t17−t13)/2) and the second half (from (t17−t13)/2 to t17) at the low communication rate, and transmits the start signal and the data at the high communication rate in FIG. 9. The electronic timepiece 20B switches between the low communication rate and the high communication rate at a point of time when a change of the bit pattern of the synchronization signal is detected.

The control circuit 202B of the electronic timepiece 20B firstly detects the synchronization signal at the low communication rate during the communication period (the OFF period) (a period of time from t11 to t12 and a period of time from t14 to t16), and maintains the low communication rate (a period of time from t14 to t15) when it is determined that the detected synchronization signal has the bit pattern of the first half. In such a state, the control circuit 202B receives the start signal and the data by switching to the high communication rate at a timing (for example, at the time t15) when it is determined that the detected synchronization signal has the bit pattern of the second half (a period of time from t15 to t20). Thereafter, the control circuit 202B switches from the communication period (the OFF period) to the charging period (the ON period) (a time t20), and further switches to the low communication rate.

For example, when the synchronization signal is started at the time t14, the control circuit 202B includes the start signal and the data at the high communication rate for about one second. The electronic timepiece 20B consumes power corresponding to the high communication rate during this period. For this reason, in the present embodiment, since the low communication rate is maintained when the synchronization signal has the bit pattern of the first half and the communication rate is switched to the high communication rate when the synchronization signal has the bit pattern of the second half, it is possible to reduce the power consumption. Although it has been described in the present embodiment that the synchronization signal has two patterns of the first half and the second half, the pattern may be two or more. For example, when the synchronization signal is transmitted in the order from a first pattern to fourth pattern, the control circuit 202B may maintain the low communication rate when the synchronization signal having the first pattern to the third pattern is received. When the synchronization signal of the fourth pattern is received, the control circuit 202B may switch to the high communication rate.

Second Modification Example of Sixth Embodiment

Hereinafter, a second modification example of the sixth embodiment will be described.

FIG. 10 is a timing chart for describing an operational example of the electronic timepiece 20B according to the second modification example of the sixth embodiment. In FIG. 10, the topmost part shows a transmission signal output from the mobile phone 10B through the optical communication, that is, a reception signal of the electronic timepiece 20B, the middle part shows a switch control signal for switching between the turn-on state and the turn-off state of the switch 203 by the control circuit 202B of the electronic timepiece 20B, and the bottommost part shows a reference signal generated by the reference signal generating circuit 206 of the electronic timepiece 20B.

In the second modification example of the sixth embodiment, the electronic timepiece 20B switches between the low communication rate and the high communication rate at a point of time when the end bit superimposed on an end of the synchronization signal is detected. That is, the mobile phone 10B which is the terminal transmits the synchronization signal including the end bit at the low communication rate, and transmits the start signal and the data at the high communication rate.

The control circuit 202B of the electronic timepiece 20B firstly detects the synchronization signal at the low communication rate during the communication period (the OFF period), and switches to the high communication rate at a timing (a time t17 of FIG. 10) when it is determined that the end bit of the synchronization signal is detected. Thereafter, the control circuit 202B receives the start signal and the data at the high communication rate (a period of time from t17 to t20 of FIG. 10), switches from the communication period (the OFF period) to the charging period (the ON period) (a time t20 of FIG. 10), and further switches to the low communication rate.

As stated above, the electronic device (the electronic timepiece 20B) of the present embodiment includes the solar cell 201, the secondary battery 204 that is charged by the solar cell, and the control circuit 202B that switches between the charging period during which the charging of the secondary battery from the solar cell is performed and the communication period during which the optical signal is received by the solar cell at every predetermined time interval. The control circuit receives the synchronization signal which is included in the optical signal and indicates the transmission of the optical signal at a first communication rate (the low communication rate) during the communication period. Thereafter, the control circuit receives the data included in the optical signal by switching to a second communication rate (the high communication rate) faster than the first communication rate.

In the electronic device (the electronic timepiece 20B) of the present embodiment, the control circuit 202B controls such that the optical signal is received at the first communication rate when the period is switched from the charging period to the communication period.

In the electronic device (the electronic timepiece 20B) of the present embodiment, the control circuit 202B switches from the second communication rate to the first communication rate after the data is received.

In the electronic device (the electronic timepiece 20B) of the present embodiment, the control circuit 202B switches to the first communication rate from the second communication rate when the period is switched from the communication period to the charging period.

In the electronic device (the electronic timepiece 20B) of the present embodiment, the control circuit 202B switches from the second communication rate to the first communication rate after a predetermined amount of time elapses when the data is not received during the communication period.

In the electronic device (the electronic timepiece 20B) of the present embodiment, the synchronization signal, the start signal indicating the transmission start of the data, and the data of the optical signal are transmitted in sequence, and the control circuit 202B switches from the first communication rate to the second communication rate when it is determined that the synchronization signal is received.

In the electronic device (the electronic timepiece 20B) of the present embodiment, when information which is included in the synchronization signal and indicates the end of the synchronization signal is received, the control circuit 202B switches from the first communication rate to the second communication rate, and receives the start signal and the data.

In the electronic device (the electronic timepiece 20B) of the present embodiment, the control circuit 202B switches from the first communication rate to the second communication rate when the start signal is received.

In the electronic device (the electronic timepiece 20B) of the present embodiment, the synchronization signal is a signal of which the first half is a first signal pattern and the second half is a second signal pattern. The control circuit 202B controls such that the first communication rate is continued when the synchronization signal having the first signal pattern is received, and switches from the first communication rate to the second communication rate when the synchronization signal having the second signal pattern is received.

In the electronic device (the electronic timepiece 20B) of the present embodiment, at least one of timings when the first communication rate and the second communication rate are started or are ended is a timing synchronized with the reference signal for generating the time information.

The method of controlling the electronic device (the electronic timepiece 20B) of the present embodiment includes a procedure of allowing the control circuit 202B to switch the charging period during which the charging of the secondary battery 204 from the solar cell 201 is performed and the communication period during which the optical signal is received by the solar cell at every predetermined time interval, and a procedure of allowing the control circuit to receive the synchronization signal which is included in the optical signal and indicates the transmission of the optical signal at the first communication rate and then to receive the data included in the optical signal by switching to the second communication rate faster than the first communication rate.

According to the sixth embodiment, since the charging period and the communication period repeated at every predetermined cycle are provided and the optical communication is performed by the solar cell 201 during the communication period, it is possible to reduce the number of times the manipulation is performed on the electronic timepiece 20 when the optical communication is performed. Since the communication rate is switched such that the synchronization signal is detected at the low communication rate and the data is received at the high communication rate, it is possible to reduce the power consumption of the electronic timepiece 20B and the mobile phone 10B.

Seventh Embodiment

Firstly, a seventh embodiment of the present invention will be described.

FIG. 1 is a block diagram showing the configurations of a mobile phone 10 and an electronic timepiece 20 of an optical communication system 1 using the electronic timepiece 20 according to the seventh embodiment. Only the configurations according to the present invention will be illustrated, and other configurations will be omitted.

In FIG. 1, the optical communication system 1 includes the mobile phone 10 and the electronic timepiece 20. The mobile phone 10 includes a time data obtaining unit 101, a transmission control unit 102, and a light source 103.

In the present embodiment, an example in which the mobile phone is used as a device that transmits data will be described. However, as the device that transmits data, a device that includes a light source and is capable of controlling a light emitting state of the light source may be used.

The time data obtaining unit 101 obtains the current time. More particularly, the time data obtaining unit 101 obtains the current time by using any method of a method of obtaining the current time by accessing a time server on the Internet, a method of obtaining the current time using the Global Positioning System (GPS), and a method of obtaining the current time from a control signal from a base station.

For example, the transmission control unit 102 converts time data obtained by the time data obtaining unit 101 into an optical signal to emit the converted optical signal from the light source 103 in response to the manipulation of a user. As will be described below, examples of the optical signal include a synchronization signal, a start signal, and time data. The transmission control unit 102 emits the optical signal by controlling the turn-on and turn-off of the light source 103.

The light source 103 includes a light-emitting diode (LEDs) for a flash included in the mobile phone 10, and a backlight of a liquid crystal panel. Light emitted from the light source 103 is light having a wavelength which is received as a signal by a solar cell 201 included in the electronic timepiece 20 and generates a power, and is, for example, white light.

The electronic timepiece 20 includes the solar cell 201, a control circuit 202, a switch 203, a secondary battery 204, a diode 205, and a reference signal generating circuit 206 (a generation circuit).

The solar cell 201 functions as a power generator that receives light from an external light source (sun or illumination) and converts the received light into electric energy during a charging period, and functions as a light receiver for performing optical communication with the mobile phone 10 during a, communication period. The charging period and the communication period will be described below.

The control circuit 202 controls the charging of the secondary battery 204 using the solar cell 201, prevents overcharging of the secondary battery 204, or controls the optical communication using the solar cell 201. More specifically, the control circuit 202 is operated by an electric power from the secondary battery 204 connected to a power terminal and a GND terminal, and determines a charged state (a fully charged state or an over-discharged state) of the secondary battery 204 by detecting an output voltage of the secondary battery, and performs predetermined charging control. That is, by controlling the turn-on state and the turn-off state of the switch 203 by a control signal output from a control terminal depending on the charged state of the secondary battery 204, the control circuit 202 charges the secondary battery 204 by connecting the solar cell 201 with the secondary battery 204, and prevents the overcharging of the secondary battery 204 by disconnecting the solar cell from the secondary battery.

The control circuit 202 switches between the connection (a charging period: an ON period, a period of time during which communication is not performed) of the solar cell 201 with the secondary battery 204 and the disconnection (a communication period: an OFF period, a period of time during which charging is not performed) of the solar cell 201 from the secondary battery 204 by controlling the turn-on state or the turn-off state of the switch 203 by a switch control signal, based on a reference signal and a signal oscillated from the reference signal generating circuit 206.

The control circuit 202 receives time data transmitted from an external device (in this case, the mobile phone 10) through the optical communication by detecting an output voltage of the solar cell 201 input to the input terminal and converting the detected voltage into an electrical signal during the communication period. Although it has been described in the present embodiment that the time data is transmitted as the data from the mobile phone 10, the present invention is not limited thereto, but another type of data may be used. The control circuit 202 detects a synchronization signal, to be described below, by using a frequency-divided signal input from the reference signal generating circuit 206.

The switch 203 switches between the connection (the charging period) of the solar cell 201 with the secondary battery 204 and the disconnection (the communication period) of the solar cell 201 from the secondary battery 204 in response to the switch control signal from the control circuit 202.

The diode 205 prevents the backflow of a charging current toward the solar cell 201.

The reference signal generating circuit 206 includes an oscillation circuit (for example, 32 kHz) and a frequency-dividing circuit, and generates a reference signal of, for example, 1 Hz. The reference signal generating circuit 206 divides an oscillated signal of 32 kHz, and generates a frequency-divided signal of a frequency corresponding to a communication rate, to be described below. The reference signal generating circuit 206 outputs the generated frequency-divided signal and the generated reference signal to the control circuit 202.

Next, the operation of the seventh embodiment will be described.

FIG. 2 is a flowchart for describing the operation of the electronic timepiece 20 according to the seventh embodiment. FIG. 3 is a timing chart for describing an operational example of the electronic timepiece 20 according to the seventh embodiment. In FIG. 3, the topmost part shows a transmission signal output from the mobile phone 10 through the optical communication, that is, a reception signal of the electronic timepiece 20, the middle part shows a switch control signal for switching between the turn-on state and the turn-off state of the switch 203 by the control circuit 202 of the electronic timepiece 20, and the bottommost part shows a reference signal generated by the reference signal generating circuit 206 of the electronic timepiece 20.

The transmission control unit 102 of the mobile phone 10 converts the transmission signal including the time data obtained by the time data obtaining unit 101 into the optical signal to emit the converted optical signal from the light source 103, as shown in the topmost part of FIG. 3. More particularly, the transmission signal includes a synchronization signal, a start signal, and data. The start signal is a signal indicating the start of data. The data is, for example, time data. In FIG. 3, one cycle of the reference signal is a period of time from t2 to t5, and is, for example, one second.

Hereinafter, the synchronization signal will be described. The synchronization signal is a pattern in which a predetermined H (turn-on) state and a predetermined L (turn-off) state are continuously repeated multiple times, and is, for example, HLHL . . . , or HLLHLL . . . . For example, the detection of the synchronization signal is performed by detecting a pattern of HLHL. When the synchronization signal is detected, if a person shades the solar cell 201 with their hand or passes in front of the solar cell 201, a pattern of HLH may be artificially generated. For this reason, a period of time from t1 to t2 shown in FIG. 3, that is, the communication period (the OFF period) is set to be greater than the time capable of detecting the pattern of the synchronization signal HLHL.

(Step S100) In the electronic timepiece 20, the control circuit 202 initially controls the communication period (the OFF period) and the charging period (the ON period) by switching the switch 203 by using the switch control signal. As shown in the middle part of FIG. 3, the control circuit 202 outputs the switch control signal having a period of time from t1 to t3 as one cycle (for example, about 1 second). For example, the OFF period of a period of time from t1 to t2 is $^1/_{100}$ of one cycle, and the ON period of a period of time from t2 to t3 is $^{99}/_{100}$ of one cycle. After step S100 is ended, the control circuit 202 proceeds to a process of step S101.

(Step S101) The control circuit 202 determines whether or not the current time is the communication period (the OFF period). When the current time is not the communication period (the OFF period), that is, when it is determined that the current time is the charging period (the ON period) (step S101; NO), the control circuit 202 returns to step S100. In this case, the charging operation of the secondary battery 204 from the solar cell 201 is continued. When it is determined that the current time is the communication period (the OFF period), that is, when it is determined that the current time is the charging period (the ON period) (step S101; YES), the control circuit 202 proceeds to step S102.

(Step S102) The control circuit 202 determines whether or not the synchronization signal is received from the mobile phone 10 during the OFF periods of a period of time from t1 to t2 and a period of time from t3 to t5. When it is determined that the synchronization signal is not received (step S102; NO), the control circuit 202 returns to step S100. That is, when the synchronization signal is not received during the communication period (the OFF period), the control circuit 202 automatically switches to the charging period (the ON period) at the time t2 or the time t5. When it is determined that the synchronization signal is received during the communication period (the OFF period) (step S102; YES), the control circuit 202 proceeds to step S103.

(Step S103) The control circuit 202 maintains the state (OFF) of the switch 203, and switches to the communication period (the OFF period). In the example shown in FIG. 3, the control circuit 202 determines that the synchronization signal is received at the time t4, and maintains the state (OFF) of the switch 203 until the reception of the data is ended after the time t4. After step S103 is ended, the control circuit 202 proceeds to a process of step S104.

(Step S104) The control circuit 202 receives the start signal transmitted from the mobile phone 10 during the communication period (the OFF period). After step S104 is ended, the control circuit 202 proceeds to a process of step S105.

(Step S105) The control circuit 202 receives the data transmitted from the mobile phone 10. After step S105 is ended, the control circuit 202 proceeds to a process of step S106.

(Step S106) After the data is received, the control circuit 202 returns to the charging period (the ON period) by switching the switch 203. This step corresponds to an operation at a time t6 shown in FIG. 3. Thereafter, the control circuit 202 returns to the process of step S100, and repeatedly performs the above-described operations.

When the received data is the time data, the control circuit 202 may reset the reference signal (for example, 1 Hz) generated by the reference signal generating circuit 206. The reset corresponds to the reference signal at the time t6 shown in FIG. 3. The reference signal has the time from t2 to t5 as one cycle and is a signal of which the next cycle starts at the time t5. At the time from t2 to t5, a period of a low level and a period of a high level are the same period of time. Meanwhile, at the time from t5 to t6, since the signal is reset in the middle of the period of the high level, the period of the high level is shorter than the period of the low level.

As mentioned previously, the switch 203 serves as a switch for preventing the overcharging of the secondary battery 204. For this reason, the control circuit 202 detects a voltage value of the secondary battery 204, and determines whether or not the detected voltage value is a voltage value in the fully-charged state. When it is determined that the detected voltage value is the voltage value in the fully-charged state, the control circuit 202 switches to the turn-off state of the switch 203, and does not perform the charging of the secondary battery 204. In this case, the switch control signal maintains the turn-off state.

The control circuit 202 may constantly detect the synchronization signal for a period of time during which the turn-off state is maintained. Alternatively, since the power consumption of the control circuit 202 is increased when the synchronization signal is constantly detected, even though the turn-off state is maintained due to such a reason, the control circuit 202 may detect the synchronization signal for only a period corresponding to the OFF period when the ON period and the OFF period are periodically repeated, as shown in FIG. 3.

As stated above, the electronic device (the electronic timepiece 20) of the present embodiment includes the solar cell 201, the secondary battery 204 that is charged by the solar cell, and the control circuit 202 that switches between the charging period during which the charging of the secondary battery from the solar cell is performed and the communication period during which the optical signal is received by the solar cell at every predetermined time interval.

The electronic device (the electronic timepiece 20) of the present embodiment includes the switch 203 that switches the connected state of the solar cell 201 with the secondary battery 204. The control circuit 202 controls the switch such that the secondary battery is disconnected from the solar cell during the communication period, and controls the switch such that the secondary battery is connected to the solar cell during the charging period.

In the electronic device (the electronic timepiece 20) of the present embodiment, the control circuit 202 detects the voltage value of the secondary battery 204, determines whether or not the detected voltage value is greater than a first threshold, and controls the switch 203 such that the secondary battery is disconnected from the solar cell 201 when it is determined that the detected voltage value is greater than the first threshold.

In the electronic device (the electronic timepiece 20) of the present embodiment, the control circuit 202 detects the voltage value of the secondary battery 204, determines whether or not the detected voltage value is less than a second threshold, and controls the switch 203 such that the secondary battery is connected to the solar cell 201 when it is determined that the detected voltage value is less than the second threshold.

The method of controlling the electronic device of the present embodiment includes a control procedure of causing the control circuit 202 to switch between the charging period during which the charging of the secondary battery 204 from the solar cell 201 is performed and the communication period during which the optical signal is received by the solar cell at every predetermined time interval.

In such a configuration, according to the seventh embodiment, since the charging period and the communication period repeated at predetermined cycles are provided and the optical communication is performed by the solar cell 201 during the communication period, the electronic timepiece 20 performs the optical communication without switching to a communication mode through the manipulation of the user on the electronic timepiece 20. As a result, in the electronic timepiece 20 of the present embodiment, it is possible to reduce the number of times the manipulation is performed on the electronic timepiece 20 when the communication is performed.

For the period of time during which the optical signal is received, when the solar cell 201 and the secondary battery 204 are connected, the optical signal detected by the control circuit 202 is affected by the voltage value of the secondary battery 204 in some cases. For example, when the level of the optical signal is lower than the voltage of the secondary battery 204, the optical signal as an output of the solar cell 201 may be drawn by the voltage of the secondary battery 204, and thus, the control circuit 202 has difficulty distinguishing between the optical signal and external disturbance light. For this reason, when the solar cell 201 and the secondary battery 204 are connected for the period of time during which the optical signal is received, reception accuracy is degraded in some cases. Accordingly, according to the seventh embodiment, it is possible to improve the reception accuracy by disconnecting the solar cell 201 from the secondary battery 204 for a period of time during which the optical communication is performed.

Eighth Embodiment

Next, an eighth embodiment of the present invention will be described.

FIG. 4 is a block diagram showing the configurations of a mobile phone 10 and an electronic timepiece 20A of an optical communication system 1A using the electronic timepiece 20A according to the eighth embodiment. The parts corresponding to FIG. 1 will be assigned the same reference numerals, and thus, the description thereof will be omitted.

As shown in FIG. 4, the mobile phone 10 includes a time data obtaining unit 101, a transmission control unit 102, and a light source 103. The electronic timepiece 20A includes a solar cell 201, a control circuit 202A, a switch 203, a secondary battery 204, a diode 205, and a reference signal generating circuit 206 (a generation circuit).

In FIG. 4, the control circuit 202A of the electronic timepiece 20A may switch between a charging period (an ON period) and a communication period (an OFF period) at predetermined cycles, may receive a synchronization signal during the communication period (the OFF period), and may control the switch 203 depending on a charged state (a fully-charged state or an over-discharged state) of the secondary battery when data is not received within a predetermined time, and may set the charging period (the ON period) and the communication period (the OFF period).

By controlling the switch 203 between the turn-on state and the turn-off state by a control signal output from a control terminal depending on the charging state of the secondary battery 204, the control circuit 202A performs the charging of the secondary battery 204 by connecting the solar cell 201 with the secondary battery 204, and prevents the overcharging of the secondary battery 204 by disconnecting the solar cell from the secondary battery. The control circuit 202A detects a voltage value of the secondary battery 204, and determines whether or not the detected voltage value is greater than a first threshold. When it is determined that the detected voltage value is greater than the first threshold, the control circuit 202A prevents the overcharging by controlling the switch 203 to enter the turn-off state such that the secondary battery 204 is disconnected from the solar cell 201.

The control circuit 202A prevents the over-discharging of the secondary battery 204 by controlling the switch 203 between the turn-on state and the turn-off state by the control signal output from the control terminal depending on the charged state of the secondary battery 204. The control circuit 202A detects the voltage value of the secondary battery 204, and determines whether or not the detected voltage value is smaller than a second threshold. When it is determined that the detected voltage value is smaller than the second threshold, the control circuit 202A prevents the over-discharging by controlling the switch 203 to enter the turn-on state such that the secondary battery 204 is connected to the solar cell 201.

In the eighth embodiment, the mobile phone 10 transmits the synchronization signal for a period longer than the charging period (the ON period) in the electronic timepiece 20A. When the rising of the charging period (the ON period) and the start of the synchronization signal occur simultaneously, the synchronization signal is not detected by the electronic timepiece 20A in some cases when the rising of the synchronization signal and the charging period (the ON period) are the same. When a cycle of the charging period (the ON period) and the communication period (the OFF period) is one second, it is preferable that the synchronization signal is, for example, one second or more. The duration of the synchronization signal may be changed by the user. For example, when the synchronization signal is not detected at an initial value, the duration of the synchronization signal may be set by the user so as to be lengthened.

Next, the operation of the eighth embodiment will be described.

FIG. 5 is a flowchart for describing the operation of the electronic timepiece 20A according to the eighth embodiment. FIG. 6 is a timing chart for describing an operational example of the electronic timepiece 20A according to the eighth embodiment. In FIG. 6, the topmost part shows a transmission signal output from the mobile phone 10 through the optical communication, that is, a reception signal of the electronic timepiece 20A, the middle part shows a switch control signal for switching between the turn-on state and the turn-off state of the switch 203 by the control circuit 202A of the electronic timepiece 20A, and the bottommost part shows a reference signal generated by the reference signal generating circuit 206 of the electronic timepiece 20A.

The transmission control unit 102 of the mobile phone 10 converts the transmission signal including the time data obtained by the time data obtaining unit 101 into the optical signal to emit the converted optical signal from the light source 103, at a time t13 as shown in the topmost part of FIG. 6. More particularly, the transmission signal includes a synchronization signal, a start signal, and data. For example, the synchronization signal is a signal having a pattern in which a predetermined high level and a predetermined low level are repeated.

As stated above, it is preferable that the duration of the synchronization signal is longer than the charging period (the ON period, a period of time from t12 to t14). FIG. 6 shows an example in which, for example, H of the synchronization signal is detected at the time t14 and the detection of the synchronization signal is ended at a timing of a time t15.

The start signal is a signal indicating the start of data. The data is time data. The data includes a second reset bit, and an end bit. Here, the second reset bit refers to a bit indicating a timing when the reference signal is reset, and the end bit refers to a bit indicating the end of the data.

(Steps S200 to S202) The control circuit 202A of the electronic timepiece 20A performs processes of steps S201 and S202, similarly to steps S100 to S102 (FIG. 2). After step S202 is ended, the control circuit 202A proceeds to a process of step S203.

(Step S203) The control circuit 202A maintains the state (OFF) of the switch 203, and switches to the communication period (the OFF period). This step corresponds to an operation after the time t15 shown in FIG. 6. After step S203 is ended, the control circuit 202A proceeds to a process of step S204.

(Step S204) The control circuit 202A determines whether or not data is received within a predetermined time. The control circuit 202A proceeds to step S205 when the data is received within the predetermined time (step S204; YES), and proceeds to step S206 when the data is not received within the predetermined time (step S204; NO).

(Step S205) After the data is received from the mobile phone 10, the control circuit 202A returns to the charging time (the ON period) by switching the switch 203, and returns to step S200, similarly to step S106 (FIG. 2). This step corresponds to an operation at a time t20 shown in FIG. 6.

The control circuit may return to the charging time (the ON period) when the end bit of the data is received, or after the data is received. When the second reset bit included in the data is detected, the control circuit 202A resets the reference signal of the reference signal generating circuit 206 (the time t20). For this reason, the timing when the switch control signal represented by the time t20 of FIG. 6 is switched from the OFF state to the ON state and the timing when the reference signal is reset may not be necessarily equal to each other.

(Step S206) The control circuit 202A switches to the charging period (the ON period) by switching the switch 203. That is, when the synchronization signal is received but the data is not received, the control circuit 202A determines that some communication errors occur, for example, a direction of the light source of the mobile phone 10 is changed, and stops a communication operation (a reception operation) in which power consumption is high. After step S207 is ended, the control circuit 202A proceeds to a process of step S208.

(Step S207) The control circuit 202A detects the voltage value of the secondary battery 204. After step S207 is ended, the control circuit 202A proceeds to a process of step S208.

(Step S208) The control circuit 202A determines whether or not the detected voltage value is greater than the first threshold. The control circuit 202A determines that the secondary battery is in the fully-charged state when the detected voltage value is greater than the first threshold, and determines that the secondary battery is not in the fully-charged state when the detected voltage value is equal to or less than the first threshold. The control circuit 202A proceeds to step S209 when it is determined that the secondary battery is in the fully-charged state (step S208; YES), and proceeds to step S211 when the secondary battery is not in the fully-charged state (step S208; NO).

(Step S209) The control circuit 202A switches to the communication period (the OFF period) by switching the switch 203, and does not perform the charging of the secondary battery 204. After step S209 is ended, the control circuit 202A proceeds to a process of step S210.

(Step S210) The control circuit 202A determines whether or not the synchronization signal is received from the mobile phone 10 (the terminal). When it is determined that the synchronization signal is not received (step S210; NO), the control circuit 202A returns to step S207, and detects that the synchronization signal is received from the mobile phone 10 in a state where the communication period (the OFF period) is maintained for a period of time during which the secondary battery 204 is fully charged.

In this case, since the power consumption of the control circuit 202A is increased when the synchronization signal is constantly detected, even though the communication period (the OFF period) is maintained, the control circuit 202A may detect the synchronization signal for only a period corresponding to the OFF period when the ON period and the OFF period are periodically repeated, as shown in FIG. 6.

When it is determined that the synchronization signal is received (step S210; YES), the control circuit 202A returns to step S204, and performs a process (after step S205) when the data is received within the predetermined time or a process (after step S206) when the data is not received within the predetermined time.

(Step S211) The control circuit 202A determines whether or not the detected voltage value is less than the second threshold. The control circuit 202A determines that the secondary battery is in the over-discharged state when the detected voltage value is less than the second threshold, and determines that the secondary battery is not in the over-discharged state when the detected voltage value is equal to or greater than the second threshold. The control circuit 202A proceeds to step S212 when it is determined that the secondary battery is in the over-discharged state (step S211; YES), and returns to step S200 when it is determined that the secondary battery is not in the over-discharged state (step S211; NO).

(Step S212) The control circuit 202A switches to the charging period (the ON period) by switching the switch 203, and performs the charging of the secondary battery 204 without performing the communication. After step S212 is ended, the control circuit 202A returns to step S207, and continues the charging of the secondary battery 204 in a state where the charging period (the ON period) is maintained for the period of time during which the secondary battery 204 is in the over-discharged state.

As discussed above, since the secondary battery 204 is in the over-discharged state, the control circuit 202A proceeds with the charging of the secondary battery 204 in the state where the charging period (the ON period) is maintained. When it is determined that the secondary battery is not in the over-discharged state (step S212; NO), the control circuit returns to step S200 in order to return to the normal operation in which the communication period (the OFF period) and the charging period (the ON period) are repeated, and repeats the above-described process.

In the above-described eighth embodiment, when the mobile phone 10 which is the terminal is a fixed-type system capable of performing transmission and reception to and from the electronic timepiece 20A by facing the electronic timepiece (for example, when the terminal is a time adjustment dedicated-device and adjusts time at the time of getting home), the cycle of the communication period (the OFF period) and the charging period (the ON period) may be, for example, 1 minute. The duration of the synchronization signal in this case may be 1 minute or more.

For example, after the time is adjusted, time data for adjusting the time may be transmitted from the mobile phone 10 which is the terminal at every hour, at several hours, or at a predetermined time such as noon.

As described above, the electronic device (the electronic timepiece 20A) of the present embodiment includes the solar cell 201, the secondary battery 204 that is charged by the solar cell, and the control circuit 202A that switches between the charging period during which the charging of the secondary battery from the solar cell is performed and the communication period during which the optical signal is received by the solar cell at every predetermined time interval. The optical signal includes the synchronization signal indicating the transmission of the data and the data, and the period of the synchronization signal is longer than the charging period.

In the electronic device (the electronic timepiece 20A) of the present embodiment, the control circuit 202A switches from the communication period to the charging period after the data is received during the communication period.

In the electronic device (the electronic timepiece 20A) of the present embodiment, when the data is not received during the communication period, the control circuit 202A switches from the communication period to the charging period after a predetermined amount of time elapses.

The electronic device (the electronic timepiece 20A) of the present embodiment includes the switch 203 that switches the connected state of the solar cell 201 with the secondary battery 204. The control circuit 202A controls the switch such that the secondary battery is disconnected from the solar cell during the communication period, and controls the switch such that the secondary battery is connected to the solar cell during the charging period.

In the electronic device (the electronic timepiece 20A) of the present embodiment, the control circuit 202A detects the voltage value of the secondary battery 204, determines whether or not the detected voltage value is greater than the first threshold, and controls the switch 203 such that the secondary battery is disconnected from the solar cell 201 when it is determined that the detected voltage value is greater than the first threshold.

In the electronic device (the electronic timepiece 20A) of the present embodiment, the control circuit 202A detects the voltage value of the secondary battery 204, determines whether or not the detected voltage value is less than the second threshold, and controls the switch 203 such that the secondary battery is connected to the solar cell 201 when it is determined that the detected voltage value is less than the second threshold.

The electronic device (the electronic timepiece 20A) of the present embodiment includes the generation circuit (the reference signal generating circuit 206) that generates the reference signal for generating time information. When the time information regarding the time is included in the data, the control circuit 202A resets the reference signal based on the received time information.

In the electronic device (the electronic timepiece 20A) of the present embodiment, the period of the optical signal is a cycle of the reference signal.

In the electronic device (the electronic timepiece 20A) of the present embodiment, the control circuit 202A switches between the communication period and the charging period at a predetermined time after the reference signal is reset based on the received time information.

As discussed above, the present embodiment is a communication system (the optical communication system 1A) that includes the electronic device, and the terminal (the mobile phone 10) communicating with the electronic device (the electronic timepiece 20A). The terminal (the mobile phone 10) includes the light source 103, and the transmission control unit 102 that transmits the optical signal including the synchronization signal indicating the transmission of the data and the data to the electronic device by controlling the light emitting state of the light source. The optical signal includes the synchronization signal, and the data, and the duration of the optical signal is the cycle of the reference signal for generating the time information in the electronic device. The electronic device includes the solar cell 201, the secondary battery 204 that is charged by the solar cell, and the control circuit 202A that switches between the charging period during which the charging of the secondary battery from the solar cell is performed and the communication period during which the optical signal is received by the solar cell at every predetermined time interval. The charging period is shorter than the period of the synchronization signal.

According to the eighth embodiment, since the charging period and the communication period repeated at predetermined cycles are provided and the optical communication is performed by the solar cell 201 during the communication period, it is possible to reduce the number of times the manipulation is performed on the electronic timepiece 20 when the optical communication is performed. It is possible to perform one-way communication, and thus, it is not necessary to provide a transmission circuit in the electronic timepiece.

According to the eighth embodiment, since the charging period and the communication period are repeated and the period of the synchronization signal transmitted from the mobile phone 10 (the terminal) is equal to or greater than the charging period (the ON period), the mobile phone 10 and the electronic timepiece 20A are capable of performing asynchronous communication. As a result, since it is possible to perform one-way communication from the mobile phone 10, there is an effect that it is not necessary to provide the transmission circuit which transmits a signal indicating that the synchronization signal is transmitted or is received to or from the electronic timepiece 20A.

Ninth Embodiment

Hereinafter, a ninth embodiment of the present invention will be described.

FIG. 7 is a block diagram showing the configurations of a mobile phone 10B and an electronic timepiece 20B of an optical communication system 1B using the electronic timepiece 20B according to the ninth embodiment. The parts corresponding to FIG. 1 will be assigned the same reference numerals, and thus, the description thereof will be omitted.

As shown in FIG. 7, the mobile phone 10B includes a time data obtaining unit 101, a transmission control unit 102B, and a light source 103. The electronic timepiece 20B includes a solar cell 201, a control circuit 202B, a switch 203, a secondary battery 204, a diode 205, and a reference signal generating circuit 206 (a generation circuit).

The control circuit 202B of the electronic timepiece 20B switches between a charging period (an ON period) and a communication period (an OFF period) at predetermined cycles, detects initially a synchronization signal at a low communication rate during the communication period (the OFF period), switches to a high communication rate (for example, a communication speed which is four times the low communication rate) after the synchronization signal is detected, and receives a start signal and a data signal. Alternatively, the control circuit 202B determines that the synchronization signal is received, and switches to the high communication rate at a timing when the reference signal is switched to L from H. After the data is received at the high communication rate, the control circuit 202B switches from the communication period (the OFF period) to the charging period (the ON period), and returns to the low communication rate. After the synchronization signal is transmitted at the low communication rate, the mobile phone 10B which is the terminal transmits the start signal and the data at the high communication rate. The low communication rate is, for example, 256 Hz and 4 Hz, and the high communication rate is, for example, 1 kHz. The low communication rate is less in power consumption than the high communication rate. That is, the electronic timepiece 20B and the mobile phone 10B of the present embodiment are capable of reducing the power consumption by switching to the low communication rate other than the period of time during which the data is received.

Next, the operation of the ninth embodiment will be described.

FIG. 8 is a flowchart for describing the operation of the electronic timepiece 20B according to the ninth embodiment. FIG. 9 is a timing chart for describing an operational example of the electronic timepiece 20B according to the ninth embodiment. In FIG. 9, the topmost part shows a transmission signal output from the mobile phone 10B through the optical communication, that is, a reception signal of the electronic timepiece 20B, the middle part shows a switch control signal for switching between the turn-on state and the turn-off state of the switch 203 by the control circuit 202B of the electronic timepiece 20B, and the bottommost part shows a reference signal generated by the reference signal generating circuit 206 of the electronic timepiece 20B.

The transmission control unit 102B of the mobile phone 10B converts the transmission signal including the time data obtained by the time data obtaining unit 101 into the optical signal to emit the converted optical signal from the light source 103, as shown in the topmost part of FIG. 9. More particularly, the transmission signal includes a synchronization signal, a start signal, and data. For example, the synchronization signal is a signal having a pattern in which a predetermined high level and a predetermined low level are repeated.

The start signal is a signal indicating the start of data. The data is time data. The transmission control unit 102B transmits the synchronization signal at the low communication rate, and transmits the start signal and the data at the high communication rate.

(Step S300) The control circuit 202B of the electronic timepiece 20B initially sets to be the low communication rate. After step S300 is ended, the control circuit 202B proceeds to a process of step S301.

(Step S301) The control circuit 202B performs the same process as that of step S101 (FIG. 2). As shown in the middle part of FIG. 9, the control circuit 202B outputs the switch control signal having a period of time from t11 to t14 as one cycle (for example, about 1 second). For example, the OFF period is 1/100 of one cycle. After step S301 is ended, the control circuit 202B proceeds to a process of step S302.

(Step S302) The control circuit 202B determines whether or not the current time is the communication period (the OFF period). When it is determined that the current time is the communication period (the OFF period) (step S302; YES), the control circuit 202B proceeds to step S303. When the current time is not the communication period (the OFF period), that is, when the current time is the charging period (the ON period) (step S302; NO), the control circuit 202B returns to step S300. In this case, the charging operation of the secondary battery 204 from the solar cell 201 is continued.

(Step S303) The control circuit 202B determines whether or not the synchronization signal is received from the mobile phone 10B. This step corresponds to an operation at a period of time from t11 to t12 and a period of time from t14 to t16 shown in FIG. 9. When it is determined that the synchronization signal is not received (step S303; NO), the control circuit 202B returns to step S300. That is, when the synchronization signal is not received during the communication period (the OFF period), the control circuit 202B automatically switches to the charging period (the ON period) at the time t12 or the time t16. This step corresponds to the operation of the OFF period at the time from t11 to t12 shown in FIG. 9. In this case, the communication rate is the low communication rate. When it is determined that the synchronization signal is received during the communication period (the OFF period) (step S303; YES), the control circuit 202B proceeds to step S304.

(Step S304) The control circuit 202B maintains the state (OFF) of the switch 203, and switches to the communication period (the OFF period). This step corresponds to an operation after a time t15 shown in FIG. 9. After step S304 is ended, the control circuit 202B proceeds to a process of step S305.

(Step S305) The control circuit 202B sets the communication rate to be the high communication rate. This step corresponds to an operation at the time t15 shown in FIG. 9. After step S305 is ended, the control circuit 202B proceeds to a process of step S306.

(Step S306) The control circuit 202B receives the start signal from the mobile phone 10B at the high communication rate during a period of time from t18 to t19 of the communication period (the OFF period). After step S306 is ended, the control circuit 202B proceeds to a process of step S307.

(Step S307) The control circuit 202B receives the data from the mobile phone 10B at the high communication rate during a period of time from t19 to t20 of the communication period (the OFF period). After step S307 is ended, the control circuit 202B proceeds to a process of step S308.

(Step S308) The control circuit 202B returns to the charging period (the ON period) by switching the switch 203. This corresponds to an operation at the time t20 shown in FIG. 9. Thereafter, the control circuit returns to step S300, switches to the low communication rate, and repeatedly performs the above-described operations.

Although it has been described in the aforementioned example that the control circuit 202B switches from the low communication rate to the high communication rate at the time t15 at which the synchronization signal is detected, the present invention is not limited. For example, the control circuit 202B may switch from the low communication rate to the high communication rate at the time t16 which is the timing when it is determined that the synchronization signal is received and the reference signal is switched from H to L.

First Modification Example of Ninth Embodiment

Hereinafter, a first modification example of the ninth embodiment will be described with reference to FIG. 9.

In the first modification example of the ninth embodiment, the mobile phone 10B which is the terminal transmits, for example, a synchronization signal having different bit patterns of the first half (from t13 to (t17−t13)/2) and the second half (from (t17−t13)/2 to t17) at the low communication rate, and transmits the start signal and the data at the high communication rate in FIG. 9. The electronic timepiece 20B switches between the low communication rate and the high communication rate at a point of time when a change of the bit pattern of the synchronization signal is detected.

The control circuit 202B of the electronic timepiece 20B initially detects the synchronization signal at the low communication rate during the communication period (the OFF period) (a period of time from t11 to t12 and a period of time from t14 to t16), and maintains the low communication rate (a period of time from t14 to t15) when it is determined that the detected synchronization signal has the bit pattern of the first half. In such a state, the control circuit 202B receives the start signal and the data by switching to the high communication rate at a timing (for example, at the time t15) when it is determined that the detected synchronization signal has the bit pattern of the second half (a period of time from t15 to t20). Thereafter, the control circuit 202B switches from the communication period (the OFF period) to the charging period (the ON period) (a time t20), and further switches to the low communication rate.

For example, when the synchronization signal is started at the time t14, the control circuit 202B waits the start signal and the data at the high communication rate for about one second. The electronic timepiece 20B consumes power corresponding to the high communication rate during this period. For this reason, in the present embodiment, since the low communication rate is maintained when the synchronization signal has the bit pattern of the first half and the communication rate is switched to the high communication rate when the synchronization signal has the bit pattern of the second half, it is possible to reduce the power consumption. Although it has been described in the present embodiment that the synchronization signal has two patterns of the first half and the second half, the pattern may be two or more. For example, when the synchronization signal is transmitted in the order from a first pattern to fourth pattern, the control circuit 202B may maintain the low communication rate when the synchronization signal having the first pattern to the third pattern is received. When the synchronization signal of the fourth pattern is received, the control circuit 202B may switch to the high communication rate.

Second Modification Example of Ninth Embodiment

Hereinafter, a second modification example of the ninth embodiment will be described.

FIG. 10 is s timing chart for describing an operational example of the electronic timepiece 20B according to the second modification example of the ninth embodiment. In FIG. 10, the topmost part shows a transmission signal output from the mobile phone 10B through the optical communication, that is, a reception signal of the electronic timepiece 20B, the middle part shows a switch control signal for switching between the turn-on state and the turn-off state of the switch 203 by the control circuit 202B of the electronic timepiece 20B, and the bottommost part shows a reference signal generated by the reference signal generating circuit 206 of the electronic timepiece 20B.

In the second modification example of the ninth embodiment, the electronic timepiece 20B switches between the low communication rate and the high communication rate at a point of time when the end bit superimposed on an end of the synchronization signal is detected. That is, the mobile phone 10B which is the terminal transmits toe synchronization signal including the end bit at the low communication rate, and transmits the start signal and the data at the high communication rate.

The control circuit 202B of the electronic timepiece 20B initially detects the synchronization signal at the low communication rate during the communication period (the OFF period), and switches to the high communication rate at a timing (a time t17 of FIG. 10) when it is determined that the end bit of the synchronization signal is detected. Thereafter, the control circuit 202B receives the start signal and the data at the high communication rate (a period of time from t17 to t20 of FIG. 10), switches from the communication period (the OFF period) to the charging period (the ON period) (a time t20 of FIG. 10), and further switches to the low communication rate.

Although it has been described in the present embodiment that the communication rate is switched to the high communication rate at the timing when it is determined that the end bit of the synchronization signal is detected, the present invention is not limited thereto. For example, the control circuit 202B may switch to the high communication rate at a timing when it is determined that the start signal is received.

As stated above, the electronic device (the electronic timepiece 20B) of the present embodiment includes the solar cell 201, the secondary battery 204 that is charged by the solar cell, and the control circuit 202B that switches between the charging period during which the charging of the secondary battery from the solar cell is performed and the communication period during which the optical signal is received by the solar cell at every predetermined time interval. The control circuit receives the synchronization signal which is included in the optical signal and indicates the transmission of the optical signal at a first communication rate (the low communication rate) during the communication period. Thereafter, the control circuit receives the data included in the optical signal by switching to a second communication rate (the high communication rate) faster than the first communication rate.

According to the ninth embodiment, since the charging period and the communication period repeated at every predetermined cycle are provided and the optical communication is performed by the solar cell 201 during the communication period, it is possible to reduce the number of times the manipulation is performed on the electronic timepiece 20 when the optical communication is performed. Since the communication rate is switched such that the synchronization signal is detected at the low communication rate and the data is received at the high communication rate, it is possible to reduce the power consumption of the electronic timepiece 20B and the mobile phone 10B.

In the present embodiment, when the period is switched from the charging period to the communication period, since the communication rate is initially switched to the low communication rate, it is possible to reduce the power consumption of the electronic timepiece 20B.

In the present embodiment, since the communication rate is switched to the low communication rate from the high communication rate after the data is received during the communication period, it is possible to reduce the power consumption of the electronic timepiece 20B.

In the present embodiment, when the period is switched to the charging period from the communication period, since the communication rate is initially switched from the high communication rate to the low communication rate, it is possible to reduce the power consumption of the electronic timepiece 20B.

In the present embodiment, when the data is not received within the predetermined time after the synchronization signal is received during the communication period, since the communication rate is switched from the high communication rate to the low communication rate after the predetermined time elapses, it is possible to reduce the power consumption of the electronic timepiece 20B.

In the present embodiment, when it is determined that the synchronization signal is received during the communication period, since the communication rate is switched from the low communication rate to the high communication rate, it is possible to reduce the power consumption of the electronic timepiece 20B.

In the present embodiment, when it is determined that the information (the end bit) indicating the end of the synchronization signal during the communication period, since the communication rate is switched to the high communication rate from the low communication rate, it is possible to reduce the power consumption of the electronic timepiece 20B.

In the present embodiment, when it is determined that the synchronization signal is received during the communication period and then the start signal is received, since the communication rate is switched from the low communication rate to the high communication rate, it is possible to reduce the power consumption of the electronic timepiece 20B.

In the present embodiment, when it is determined that the synchronization signal includes at least the first signal pattern (the first-half pattern) and the second signal pattern (the second-half pattern) and the first-half pattern is received, the low communication rate is maintained. When it is determined that the second-half pattern is received, since the communication rate is switched from the low communication rate to the high communication rate, it is possible to reduce the power consumption of the electronic timepiece 20B.

Tenth Embodiment

Hereinafter, a tenth embodiment of the present invention will be described. The parts corresponding to the aforementioned configuration will be described by being assigned the same reference numerals.

The optical communication system 1B according to the present embodiment includes a mobile phone 10B, and an electronic timepiece 20B, as shown in FIG. 7.

The mobile phone 10B includes a time data obtaining unit 101, a transmission control unit 102B, and a light source 103. The electronic timepiece 20B includes a solar cell 201, a control circuit 202C, a switch 203, a secondary battery 204, a diode 205, and a reference signal generating circuit 206 (a generation circuit).

The transmission control unit 102B of the mobile phone 10B transmits a synchronization signal for a predetermined period of time to the light source 103. The synchronization signal transmitted by the transmission control unit 102B once is formed by alternately repeating a transmission zone in which the optical signal is transmitted and a pause zone in which the optical signal is not transmitted at every predetermined cycle $T_s$ (hereinafter, referred to as a sampling cycle). An example of the synchronization signal will be described below.

Similarly to the aforementioned embodiments, after the transmission of the synchronization signal is completed, the transmission control unit 102B transmits a start signal and time data to the light source 103. The transmission control unit 102B may transmit the start signal and the time data at a communication rate (a high communication rate) higher than the communication rate of the synchronization signal (a low communication rate).

The control circuit 202B of the electronic timepiece 20B performs sampling on a voltage of a reception signal received by the solar cell 201 at every predetermined cycle Ts (for example, corresponding to 0.25 seconds, 4 Hz) based on the frequency-divided signal described above. The control circuit 202B detects the synchronization signal based on the voltage of the received sampled signal. When the synchronization signal is detected, the control circuit 202B releases the solar cell 201 from the secondary battery 204, and stops the charging of the secondary battery 204 by controlling the OFF state of the switch 203 until the reception of the time data is ended. In this case, the control circuit 202B detects the voltage of a signal input to an input terminal from one terminal of the solar cell 201, and converts the detected voltage into an electrical signal. Thus, the start signal and the time data are extracted from the optical signal received from the mobile phone 10B.

Hereinafter, a method of detecting the synchronization signal by the control circuit 202B in the present embodiment will be described. The control circuit 202B releases the solar cell 201 from the secondary battery 204 at every predetermined cycle $T_s$ during a charging period (an ON period), and performs the sampling (reception sampling) on the voltage of the reception signal input to the input terminal. The control circuit 202B repeatedly performs the reception sampling a predetermined number of times $n_s$ (hereinafter, referred to as a sample number) all at once. The number of samples $n_s$ is an integer of more than 1. The control circuit 202B determines whether or not the sampled voltage is H (high level) higher than the threshold of a predetermined voltage or is L (low level) which is equal to or less than the threshold.

The control circuit 202B determines whether or not a sampling pattern in which $n_s$ number of states H (high levels) or states L (low levels) are continuously formed is coincident with a predetermined model pattern (for example, HLHL). When it is determined that the sampling pattern is coincident with the model pattern, the control circuit 202B determines that the synchronization signal is received. The model pattern is a pattern constructed by $n_s$ number of transmission zones and pause zones which are included in the synchronization signal and are continuously connected in time. The transmission zone and the pause zone correspond to H (high level) and L (low level), respectively. When the sampling pattern is not coincident with the predetermined model pattern, the control circuit 202B determines that the synchronization signal is not received.

Figure 11:
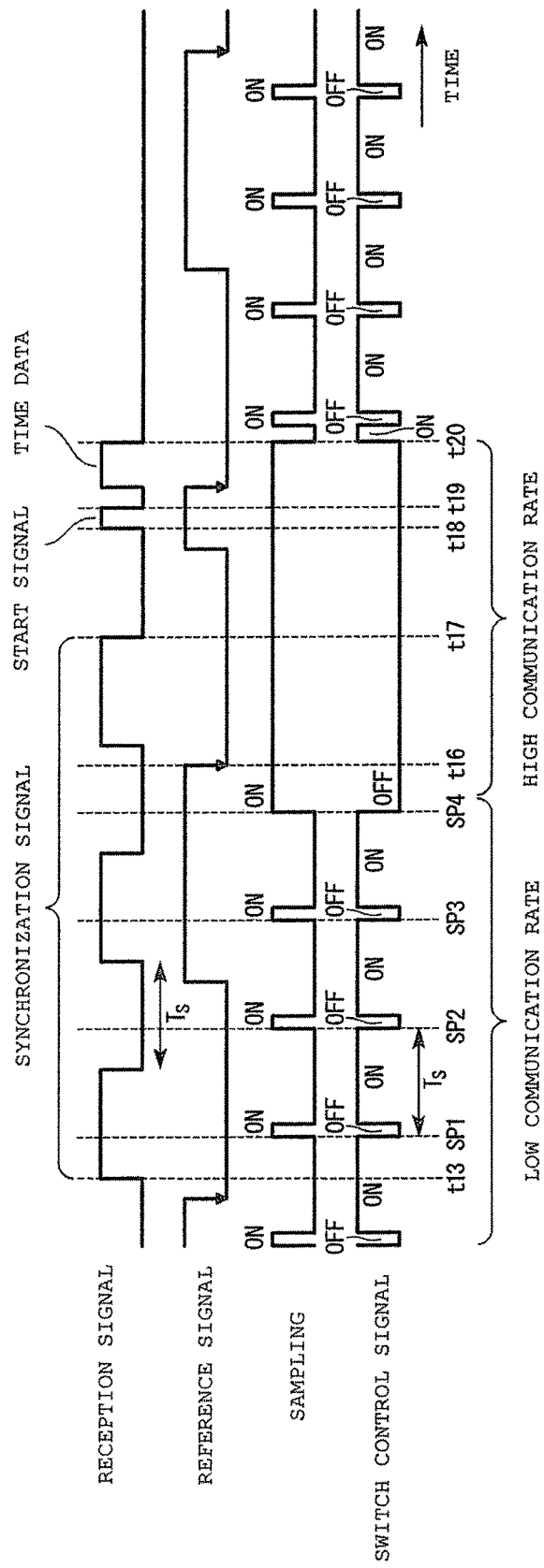
FIG. 11 is a timing chart for describing an operational example of an electronic timepiece according to a tenth embodiment.

FIG. 11 is a timing chart for describing an operational example of the electronic timepiece 20B according to the tenth embodiment. In FIG. 11, the topmost part shows the reception signal received by the electronic timepiece 20B from the mobile phone 10B, and the second part from the top shows the reference signal generated by the reference signal generating circuit 206. In FIG. 11, the third part from the top shows a timing when the control circuit 202B performs sampling on the reception signal during a partial period of the charging period (the ON period), and the bottommost part shows a switch control signal for switching between the turn-on state and the turn-off state of the switch 203 by the control circuit 202B of the electronic timepiece 20B. The turn-on state and the turn-off state indicated by the switch control signal represent the charging period (the ON period) and the communication period (the OFF period), respectively.

In the example shown in FIG. 11, the electronic timepiece 20B receives the synchronization signal as the reception signal during a period of a period of time from t13 to t17. The synchronization signal includes three transmission zones and two pause zones, and is longer than one cycle of the reference signal. One cycle of the reference signal corresponds to one low-level period and one high-level period (for example, one second) that are adjacent to each other. The transmission zone and the pause zone are switched at every cycle $T_s$.

On the other hand, the control circuit 202B continuously performs sampling on whether or not there is the reception signal during the charging period. When the reception signal is received, the control circuit 202B detects (performs sampling on) the voltages from the solar cell 201 input to the input terminal in, for example, sampling times SP1, SP2, SP3, and SP4 of sampling times that are sequentially repeated. The voltage generated through the power generation of the solar cell 201 by receiving the optical signal is detected by the input terminal of the control circuit 202B. In this example, the number of samples $n_s$ is four per second. That is, whether or not there is the synchronization signal is detected at a low communication rate of 4 Hz. An interval between the sampling times adjacent to each other is equal to the cycle $T_s$. The control circuit 202B determines whether or not the states of the voltages detected in the sampling times SP1, SP2, SP3 and SP4 are coincident with the predetermined model pattern that is previously set. Here, the synchronization signal transmitted from the mobile phone 10B is previously set to be a signal pattern corresponding to the predetermined model pattern. In the present embodiment, the predetermined model pattern is, for example, a pattern constructed by H, L, H, and L states in sequence at cycles of 4 Hz of the low communication rate. The control circuit 202B determines whether or not the sampling pattern constructed by the states of the sampled voltages is coincident with the model pattern.

If it is determined to be L in the sampling time SP4 and it is determined to be HLH in sequence in the sampling times SP1, SP2 and SP3 directly before the sampling time SP4, since the sampling pattern is coincident with HLHL which is the model pattern used to determine the synchronization signal, the control circuit 202B determines that the synchronization signal is received. Thereafter, the control circuit 202B switches from the charging period (the ON period) to the communication period (the OFF period), and starts to detect the voltage of the reception signal input to the input terminal at a high communication rate which is a higher rate than the low communication rate of the sampling performed during the communication period.

The control circuit 202B detects the end of the synchronization signal based on the detected voltage at the time t17.

The control circuit 202B detects the start signal for a period of time from t18 to t19, and then starts to receive the time data. The control circuit 202B ends the reception of the time data at a time t20, and switches from the communication period (the OFF period) to the charging period (the ON zone). Thereafter, the control circuit 202B performs the sampling again at a low communication rate of 4 Hz, and repeats the operation of detecting whether or not there is the synchronization signal.

It is preferable that the number of samples ns of the model pattern is 4 or more. The alternate change of the states H and the states L at every cycle Ts being repeated four or more times rarely occurs due to a natural phenomenon or an activity of daily living of a user. It is assumed that the number of samples ns is 3 and the predetermined model pattern for detecting the synchronization signal is HLH. On the other hand, when sunlight is received as the optical signal, if the optical signal is blocked by momentarily covering the solar cell 201 with the hand of the user or the other object, since the state of the voltage of the reception signal at this time is determined to be L for the period during which the optical signal is blocked and the state of the voltage of the reception signal is determined to be H before and after the optical signal is blocked, the control circuit 202B detects the sampling pattern of HLH. For this reason, there is a concern that the control circuit 202B may mistakenly recognize such a sampling pattern as the synchronization signal. Thus, it is preferable that whether or not there is the synchronization signal is determined using a model pattern such as the model pattern of HLHL which are constructed by the states of the reception signal of which the number of samples ns is four or more.

One sampling time $t_s$ of the respective sampling times is, for example, about several milliseconds. However, as long as it is possible to determine the state of the reception signal and it is possible to obtain the effect of reducing the power consumption, the sampling time may be, for example, several microseconds to several tens of milliseconds. In other words, when the synchronization signal is detected, since it is possible to shorten the period during which the charging of the secondary battery 204 is stopped, it is possible to suppress degradation in charging efficiency. It is possible to reduce the amount of power consumption by shortening the period required to receive the reception signal.

The total number of the transmission zones and the pause zones included in the synchronization signal may be equal to or greater than the number of samples $n_s$. If the model pattern corresponding to the transmission zones and the pause zones rarely occurs due to the natural phenomenon or the activity of daily living of the user, the transmission zones and the pause zones included in the synchronization signal may not be alternately repeated.

At some timings when the mobile phone 10B detects the end of the synchronization signal, the voltage of the reception signal detected by the control circuit 202B is not constant by performing the sampling once, and the state of the voltage is in transition from L (low level) to H (high level) or is in transition from H (high level) to L (low level). In such a case, the control circuit 202B may set the sampling time again at a time obtained by delaying the original sampling time by a predetermined delay time. The delay time may be a time which is longer than the sampling time $t_s$ required to perform the sampling once and is shorter than the sampling cycle $T_s$. Thus, since each sampling period of time started from each sampling time is deviated from a point of time at which the state of the voltage of the reception signal is changed, the control circuit 202B is capable of stably determining the state of the voltage of the reception signal.

The time at which the communication period is started may be a time which elapses from the last sampling time SP4 by the cycle $T_s$. When the total number of the transmission zones and the pause zones included in the synchronization signal is $n_s+1$, it is possible to shorten the time until the end of the synchronization signal is detected after the reception of the synchronization signal is detected. Accordingly, it is possible to secure the charging time, and it is possible to reduce the amount of power consumption.

Although it has been described above that the control circuit 202B receives the reception signal at the high communication rate during the communication period started directly after the sampling time SP4, the present invention is not limited thereto. The control circuit 202B may receive the reception signal at the high communication rate during a period of time from t17 to t20 after the synchronization signal is ended. The amount of power consumption when the reception signal is received at the high communication rate is greater than the amount of power consumption when the reception signal is received at the low communication rate, but since a zone in which it is likely to receive target data (the time data in this example) is limited, it is possible to reduce the amount of power consumption.

When the synchronization signal is not detected through the aforementioned process, the control circuit 202B may continue the charging period without starting the communication period. In this case, the control circuit 202B may measure the reception signal at every cycle $T_s$, and may repeat the process related to the detection of the synchronization signal based on the sampling pattern which includes the states of the measured reception signal.

As discussed above, in the electronic device (for example, the electronic timepiece 20B) according to the present embodiment, the solar cell 201 detects the synchronization signal indicating the transmission of predetermined data (for example, time data) through the optical communication at a sampling width for an extremely short period of time in the respective sampling times repeated at the low rate during a partial period of the charging period. For this reason, since it is possible to reduce the amount of power consumption and the period during which the charging is stopped in order to detect the synchronization signal, it is possible to efficiently operate the power.

The electronic device (for example, the electronic timepiece 20B) according to the present embodiment performs the sampling on the voltage based on the reception signal received by the solar cell 201 at predetermined cycles (for example, cycles $T_s$) during the partial period of the charging period, and detects the synchronization signal based on the pattern including the states of the sampled voltages a predetermined number of times (for example, the number of samples $n_s$). In such a configuration, it is possible to more precisely detect the synchronization signal based on the states (for example, the transmission zones and the reception zones) of the synchronization signal changed at every time interval.

The electronic device according to the present embodiment detects (performs the sampling on) the voltage by the solar cell 201 at a transition time deviated from a time (for example, from H to L, or from L to H) at which the state of the reception signal is in transition. For this reason, since it is possible to accurately determine the transmission state of the synchronization signal, it is possible to more precisely detect the synchronization signal.

Although the aspects for implementing the present invention have been described using the embodiments, the present invention is not limited to the embodiments, but various modifications and substitutions are possible without departing from the gist of the present invention.

Although it has been described in the first and tenth embodiments that the data transmitted from the mobile phone 10 (10B) is the time data, the present invention is not limited thereto. For example, the data may be indication information indicating time, or information indicating that the time reaches an alarm time. In this case, the control circuit 202 (202A, 202B) of the electronic timepiece 20 (20A, 20B) controls the operation of the electronic timepiece 20 (20A, 20B) based on the received data.

Although it has been described in the first to tenth embodiments that the electronic device is the electronic timepiece 20 (20A, 20B), the present invention is not limited thereto. The electronic timepiece 20 (20A, 20B) which is the electronic device may be an electronic device including a solar cell (a solar panel). For example, the electronic device may be a mobile phone (including a so-called smartphone) different from the mobile phone 10 (10B), a tablet terminal device, or a television receiver. The optical communication system 1 (1A, 1B) may include a plurality of electronic timepieces 20 (20A, 20B).

Although it has been described in the first to tenth embodiments that an electronic device (a second electronic device) different from the electronic device (the first electronic device) is the mobile phone 10 (10B), the present invention is not limited thereto. The second electronic device may include the light source 103 in which the emission of light is controlled by the transmission control unit 102 (102B). The second electronic device is not limited to the terminal such as the tablet terminal device or the television receiver, but may be an illumination device having a main function of emitting light, for example, a ceiling light, a cord pendant, a downlight, or an electronic device including these lights. The light source 103 and the transmission control unit 102 (102B) constituting the second electronic device may not necessarily integrated, and may be provided as separate members.

The control circuit 202 (202A, 202B) and the transmission control unit 102 (102B) may be operated and controlled by recording programs for implementing the functions of the control circuit 202 (202A, 202B) and the transmission control unit 102 (102B) in the present invention in a computer-readable recording medium, causing a computer system to read the programs recorded in the recording medium, and executing the read programs. The "computer system" mentioned herein includes an OS or hardware such as a peripheral device. The "computer system" also includes a WWW system including a homepage providing environment (or a display environment). The "computer-readable recording medium" refers to a portable medium such as a flexible disk, a magneto-optical disk, a ROM or a CD-ROM, or a storage device such as a hard disk built in the computer system. The "computer-readable recording medium" includes a medium that retains the programs for a predetermined period of time, such as a volatile memory (RAM) within the computer system which is a server or a client when the programs are transmitted via a network such as the Internet or a communication line such as a telephone line.

The program may be transmitted from the computer system that stores the program in the storage device through a transmission medium or transmission waves of the transmission medium to another computer system. Here, the "transmission medium" that transmits the program refers to a medium having a function of transmitting information, such as a network (a communication network) such as the Internet or a communication line such as a telephone line. The program may be a program for implementing a part of the function. The program may implement the function by being combined with the programs already stored in the computer system, or may be a difference file (a difference program).

INDUSTRIAL APPLICABILITY

The present invention is applicable to an electronic device capable of switching between a communication section in which optical communication is performed and a charging section without the manipulation of a user.

REFERENCE SIGNS LIST 1, 1A, 1B . . . Optical communication system
10, 10B . . . Mobile phone
20, 20A, 20B . . . Electronic timepiece
101 . . . Time data obtaining unit
102, 102B . . . Transmission control unit
103 . . . Light source
20, 20A, 20B . . . Electronic timepiece
201 . . . Solar cell
202, 202A, 202B . . . Control circuit
203 . . . Switch
204 . . . Secondary battery
205 . . . Diode
206 . . . Reference signal generating circuit

The invention claimed is:

1. An electronic device comprising:
a solar cell;
a secondary battery that is charged by the solar cell; and
a control circuit that switches between a charging period during which the charging of the secondary battery from the solar cell is performed and a communication period during which an optical signal is received by the solar cell,
wherein the optical signal includes a synchronization signal indicating the transmission of data, and the data, and
a period of the synchronization signal is longer than the charging period.

2. The electronic device according to claim 1, wherein the control circuit switches between the communication period and the charging period after the data is received during the communication period.

3. The electronic device according to claim 1, wherein, when the data is not received during the communication period, the control circuit switches from the communication period to the charging period after a predetermined amount of time elapses.

4. The electronic device according to claim 1, further comprising:
a switch that switches a connected state of the solar cell and the secondary battery,
wherein the control circuit controls the switch such that the secondary battery is disconnected from the solar cell during the communication period, and controls the switch such that the secondary battery is connected to the solar cell during the charging period.

5. The electronic device according to claim 4, wherein the control circuit detects a voltage value of the secondary battery, determines whether or not the detected voltage value is greater than a first threshold, and controls the switch such that the secondary battery is disconnected from the solar cell when it is determined that the detected voltage value is greater than the first threshold.

6. The electronic device according to claim 4, wherein the control circuit detects the voltage value of the secondary battery, determines whether or not the detected voltage value is less than a second threshold, and controls the switch such that the secondary battery is connected to the solar cell when it is determined that the detected voltage value is less than the second threshold.

7. The electronic device according to claim 1, further comprising:
a generation circuit that generates a reference signal for generating time information,
wherein, when time information regarding time is included in the data, the control circuit resets the reference signal based on the received time information.

8. The electronic device according to claim 7, wherein a period of the optical signal is a cycle of the reference signal.

9. The electronic device according to claim 7, wherein the control circuit switches between the communication period and the charging period at a predetermined time based on the received time information after the reference signal is reset.

10. An electronic device comprising:
a solar cell;
a secondary battery that is charged by the solar cell; and
a control circuit that switches between a charging period during which the charging of the secondary battery from the solar cell is performed and a communication period during which an optical signal is received by the solar cell,
wherein the control circuit measures a voltage value of the solar cell at predetermined time intervals, and switches from the charging period to the communication period when a pattern constructed by a plurality of states of the measured voltage values is coincident with a predetermined pattern.

11. An electronic device comprising:
a solar cell;
a secondary battery that is charged by the solar cell; and
a control circuit that switches between a charging period during which the charging of the secondary battery from the solar cell is performed and a communication period during which an optical signal is received by the solar cell,
wherein, during the communication period, the control circuit receives a synchronization signal which is included in the optical signal and indicates the transmission of the optical signal at a first communication rate, and then receives data included in the optical signal by switching to a second communication rate greater than the first communication rate.

12. The electronic device according to claim 11, wherein the control circuit controls such that the optical signal is received at the first communication rate when the period is switched from the charging period to the communication period.

13. The electronic device according to claim 11, wherein the control circuit switches from the second communication rate to the first communication rate after the data is received.

14. The electronic device according to claim 11, wherein the control circuit switches from the second communication rate to the first communication rate when the period is switched from the communication period to the charging period.

15. The electronic device according to claim 11, wherein, when the data is not received during the communication period, the control circuit switches from the second communication rate to the first communication rate after a predetermined amount of time elapses.

16. The electronic device according to claim 11,
wherein the synchronization signal, a start signal indicating the transmission start of the data and the data of the optical signal are transmitted in sequence, and
the control circuit switches from the first communication rate to the second communication rate when it is determined that the synchronization signal is received.

17. The electronic device according to claim 16, wherein, when information that is included in the synchronization signal and indicates the end of the synchronization signal is received, the control circuit switches from the first communication rate to the second communication rate, and receives the start signal and the data.

18. The electronic device according to claim 16, wherein, when the start signal is received, the control circuit switches from the first communication rate to the second communication rate.

19. The electronic device according to claim 11,
wherein the synchronization signal is a signal of which a first half is a first signal pattern and a second half is a second signal pattern, and
the control circuit controls such that the first communication rate is maintained when the synchronization signal having the first signal pattern is received, and controls such that the communication rate is switched from the first communication rate to the second communication rate when the synchronization signal having the second signal pattern is received.

20. The electronic device according to claim 11, wherein at least one timing of timings when the first communication rate and the second communication rate are started and ended is a timing synchronized with a reference signal for generating time information.

21. A communication system that includes a first electronic device, and a second electronic device which communicates with the first electronic device,
wherein the second electronic device includes:
a light source; and
a transmission control unit which transmits an optical signal including a synchronization signal indicating the transmission of data and the data to the first electronic device by controlling a light emitting state of the light source,
the first electronic device includes:
a solar cell;
a secondary battery which is charged by the solar cell; and
a control circuit which switches between a charging period during which the charging of the secondary battery from the solar cell is performed and a communication period during which an optical signal is received by the solar cell, and
the charging period is shorter than a period of the synchronization signal.

22. A method of controlling an electronic device, comprising:
switching between a charging period during which charging of a secondary battery from a solar cell is performed and a communication period during which an optical signal that includes a synchronization signal indicating the transmission of data and the data is received by the solar cell; and
determining whether at least a part of the synchronization signal included in the optical signal is received during a communication period and, if so, extending the communication period to enable the solar cell to receive the whole data included in the optical signal.

23. The method of controlling an electronic device according to claim 22, wherein a period of the synchronization signal is longer than the charging period.

24. The method of controlling an electronic device according to claim 22, including switching to the charging period immediately after the whole data is received by the solar cell.

* * * * *